(12) United States Patent
Hatto et al.

(10) Patent No.: US 11,714,274 B2
(45) Date of Patent: Aug. 1, 2023

(54) MICROSCOPE SYSTEM

(71) Applicant: NIKON CORPORATION, Tokyo (JP)

(72) Inventors: Mao Hatto, Yokohama (JP); Yutaka Sasaki, Yokohama (JP); Hideo Takahashi, Yokohama (JP); Norio Yoshida, Tokyo (JP)

(73) Assignee: NIKON CORPORATION, Tokyo (JP)

( * ) Notice: Subject to any disclaimer, the term of this patent is extended or adjusted under 35 U.S.C. 154(b) by 384 days.

(21) Appl. No.: 16/885,084

(22) Filed: May 27, 2020

(65) Prior Publication Data

US 2020/0285038 A1    Sep. 10, 2020

Related U.S. Application Data

(63) Continuation of application No. PCT/JP2017/042685, filed on Nov. 28, 2017.

(51) Int. Cl.
*G02B 21/36* (2006.01)
*G02B 21/00* (2006.01)

(52) U.S. Cl.
CPC ......... *G02B 21/367* (2013.01); *G02B 21/008* (2013.01); *G02B 21/368* (2013.01)

(58) Field of Classification Search
CPC .. G02B 21/367; G02B 21/008; G02B 21/368; G02B 21/365
See application file for complete search history.

(56) References Cited

U.S. PATENT DOCUMENTS

| | | | |
|---|---|---|---|
| 2003/0030902 A1 | 2/2003 | Fukushima et al. | |
| 2014/0198980 A1 | 7/2014 | Fukui et al. | |
| 2017/0132515 A1 | 5/2017 | Yokoi et al. | |
| 2018/0240225 A1* | 8/2018 | Harada | G06T 7/001 |
| 2018/0357201 A1 | 12/2018 | Ando | |

FOREIGN PATENT DOCUMENTS

| | | | |
|---|---|---|---|
| JP | H03-167535 A | | 7/1991 |
| JP | 2005-292538 A | | 10/2005 |
| JP | 2016-208854 A | | 12/2016 |
| JP | 2016208854 A | * | 12/2016 |

OTHER PUBLICATIONS

Feb. 13, 2018 International Search Report issued in International Patent Application No. PCT/JP2017/042685.
Mar. 2, 2021 Office Action issued in Japanese Patent Application No. 2019-556440.
Aug. 17, 2021 Office Action issued in Japanese Patent Application No. 2019-556440.

* cited by examiner

*Primary Examiner* — Hesham K Abouzahra
(74) *Attorney, Agent, or Firm* — Oliff PLC

(57) ABSTRACT

An acquisition condition is decided for a second image of improved quality. Values $x_i$ resulting from down sampling brightness values of an input first image are accepted by an input layer. A filter is scanned and a convolutional computation performed in a convolutional layer. Outputs $z_1$ to $z_4$ of the convolutional layer and a first image acquisition condition $v=(v_1, v_2, v_3, v_4)$ of the first image are accepted by an output layer and a second acquisition condition y is computed by the output layer.

15 Claims, 34 Drawing Sheets

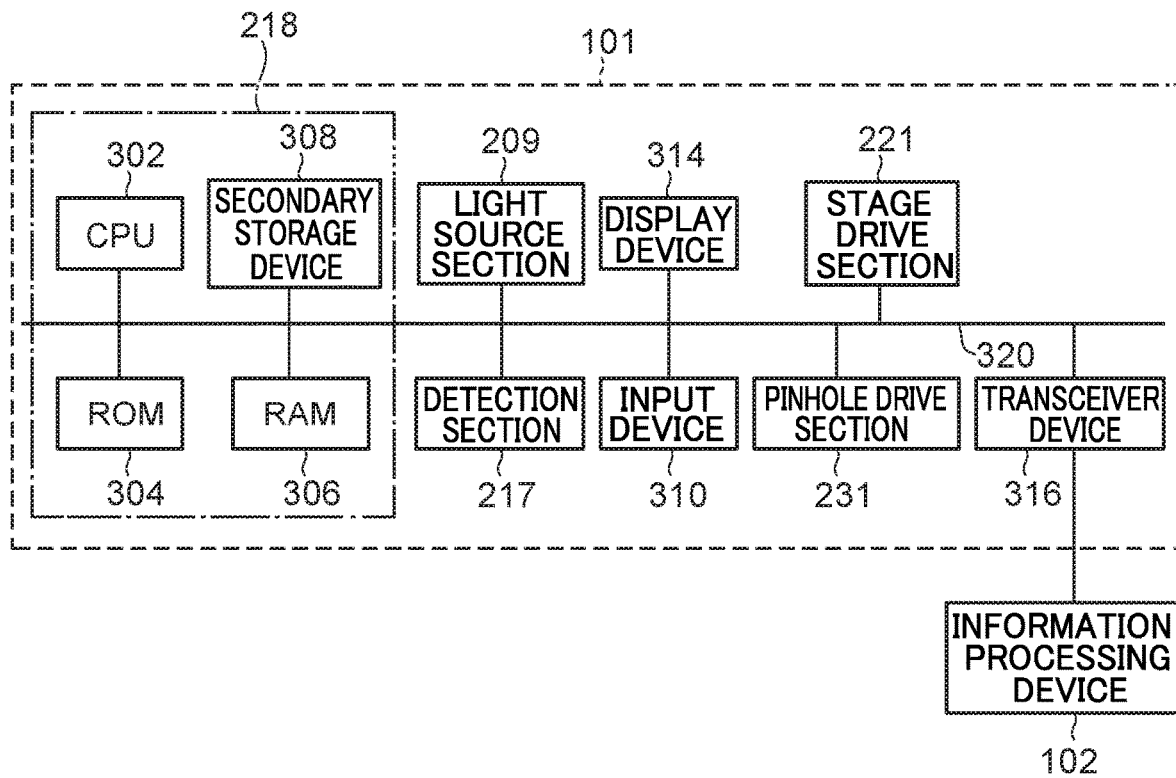
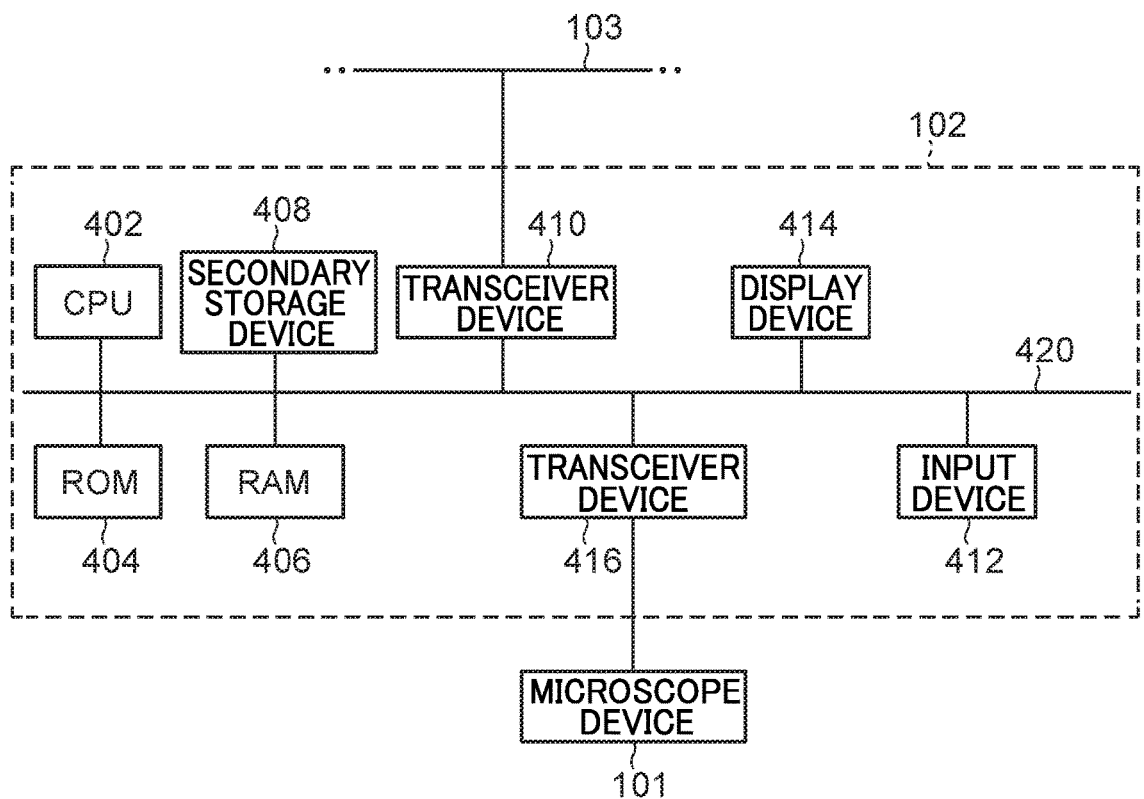

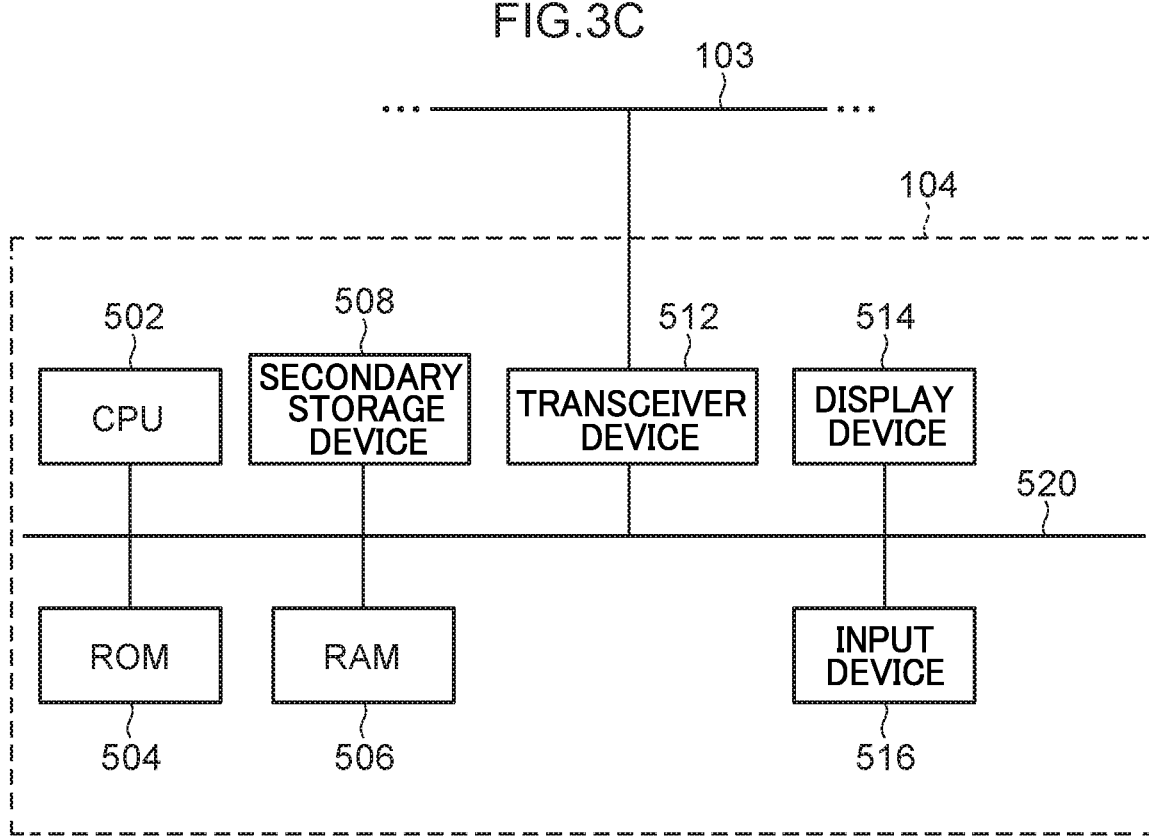

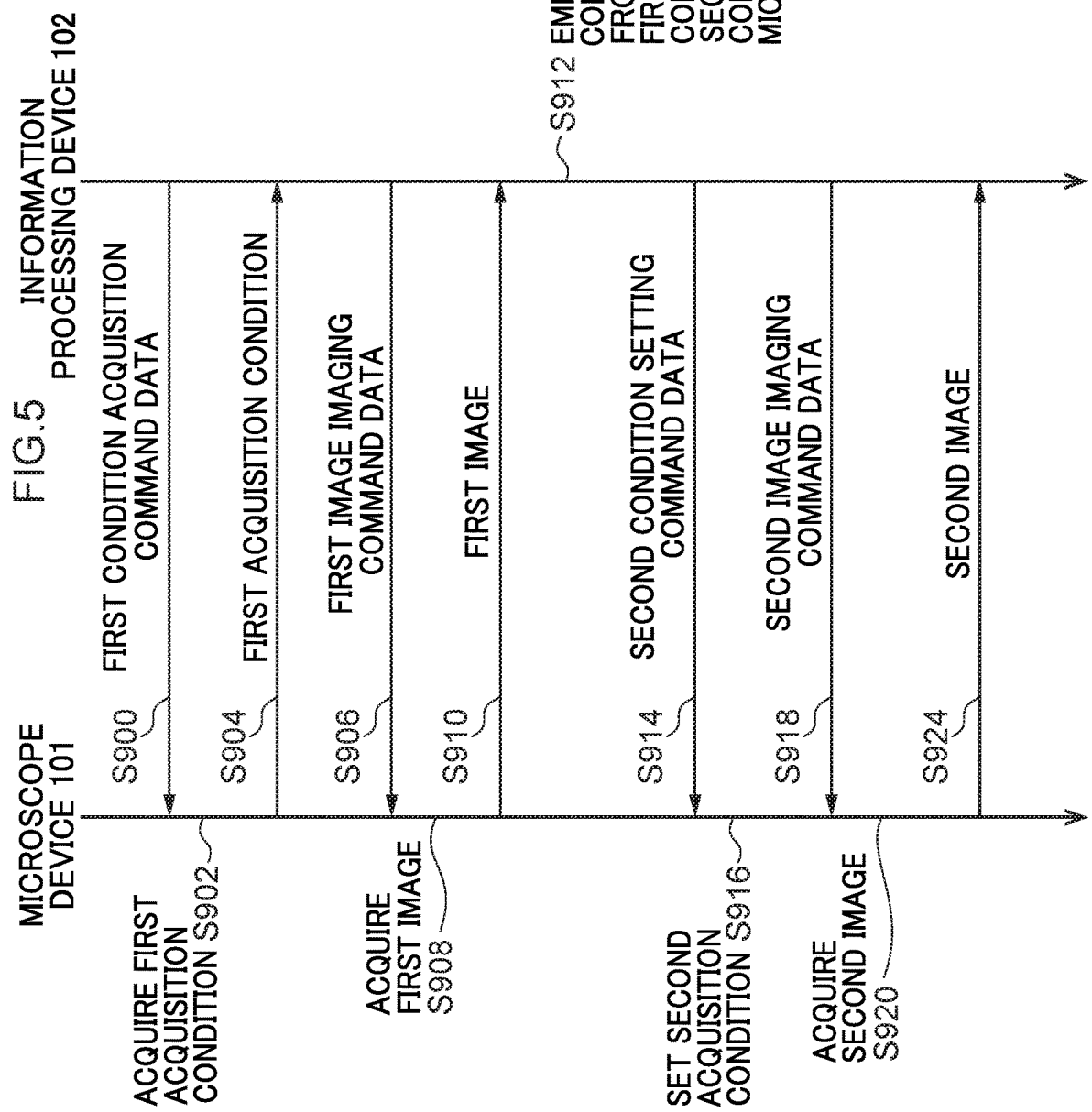

701: INPUT LAYER
702: CONVOLUTIONAL LAYER
703: OUTPUT LAYER

701: INPUT LAYER
702: CONVOLUTIONAL LAYER
703: OUTPUT LAYER

MICROSCOPE SYSTEM

This is a Continuation of Application No. PCT/JP2017/042685 filed Nov. 28, 2017. The disclosure of the prior application is hereby incorporated by reference herein in its entirety.

TECHNICAL FIELD

The technology disclosed herein relates to a microscope system.

BACKGROUND ART

In a proposed scanning optical microscope device a measurement sample is scanned, and the image obtained thereby is employed to decide the shape of a shape-shifting mirror (Patent Document 1).

RELATED ART DOCUMENTS

Patent Documents

Patent Document 1: Japanese Patent Application Laid-Open (JP-A) No. 2005-292538.

SUMMARY OF INVENTION

A microscope system according to a first aspect of the present disclosure includes a decision section configured to decide an acquisition condition of a second image based on a first image and an acquisition condition of the first image.

A microscope system according to a second aspect of the present disclosure includes a decision section configured to decide an acquisition condition of a second image based on a first image and an acquisition condition of the first image, wherein the acquisition condition of the second image includes plural items.

A microscope system according to a third aspect of the present disclosure includes an illumination optical system configured to illuminate an object with light emitted from a light source, a detection section configured to detect light from the object, an image generation section configured to generate an image by employing the detected light, and a decision section configured to decide an acquisition condition of a second image based on the first image and an acquisition condition of the first image.

A microscope system according to a fourth aspect of the present disclosure includes an illumination optical system configured to illuminate an object with light emitted from a light source, a detection section configured to detect light from the object, an image generation section configured to generate an image by employing the detected light, and a decision section configured to decide an acquisition condition of a second image based on a first image, wherein the second image acquisition condition includes plural items.

BRIEF DESCRIPTION OF DRAWINGS

FIG. 3A is a block diagram illustrating an example of relevant configuration of an electrical system of the microscope device 101 according to a first exemplary embodiment.

FIG. 3B is a block diagram illustrating an example of relevant configuration of an electrical system of an information processing device 102 according to a first exemplary embodiment.

FIG. 3C is a block diagram illustrating an example of relevant configuration of an electrical system of a server 104 according to a first exemplary embodiment.

FIG. 5 is a diagram illustrating an example of a task sequence when an image acquisition processing program is executed by a CPU 302 of a microscope control section 218 of the microscope device 101 and a CPU 402 of the information processing device 102.

DESCRIPTION OF EMBODIMENTS

Description follows regarding examples of exemplary embodiments according to the present invention, with reference to the appended drawings.

A first exemplary embodiment will now be described.
Configuration

Figure 1:
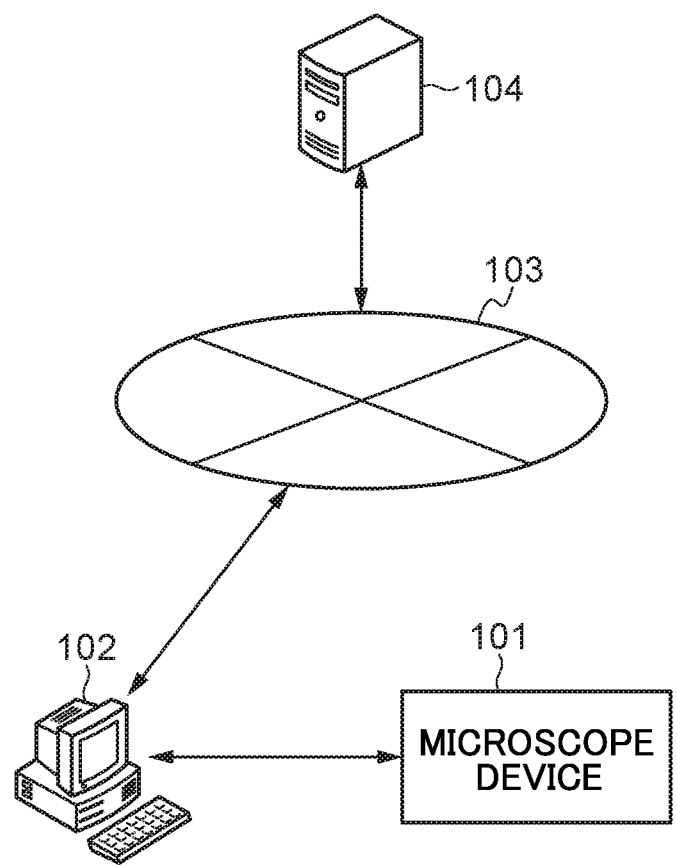
FIG. 1 is a diagram illustrating an example of a microscope system.

A configuration of a microscope system will now be described with reference to FIG. 1. As illustrated in FIG. 1, a microscope system is equipped with an information processing device 102 and a server device (hereafter referred to as "server") 104 that are mutually connected over a network 103, and with a laser scanning microscope (hereafter referred to as microscope) 101 that is connected to the information processing device 102.

Figure 2:
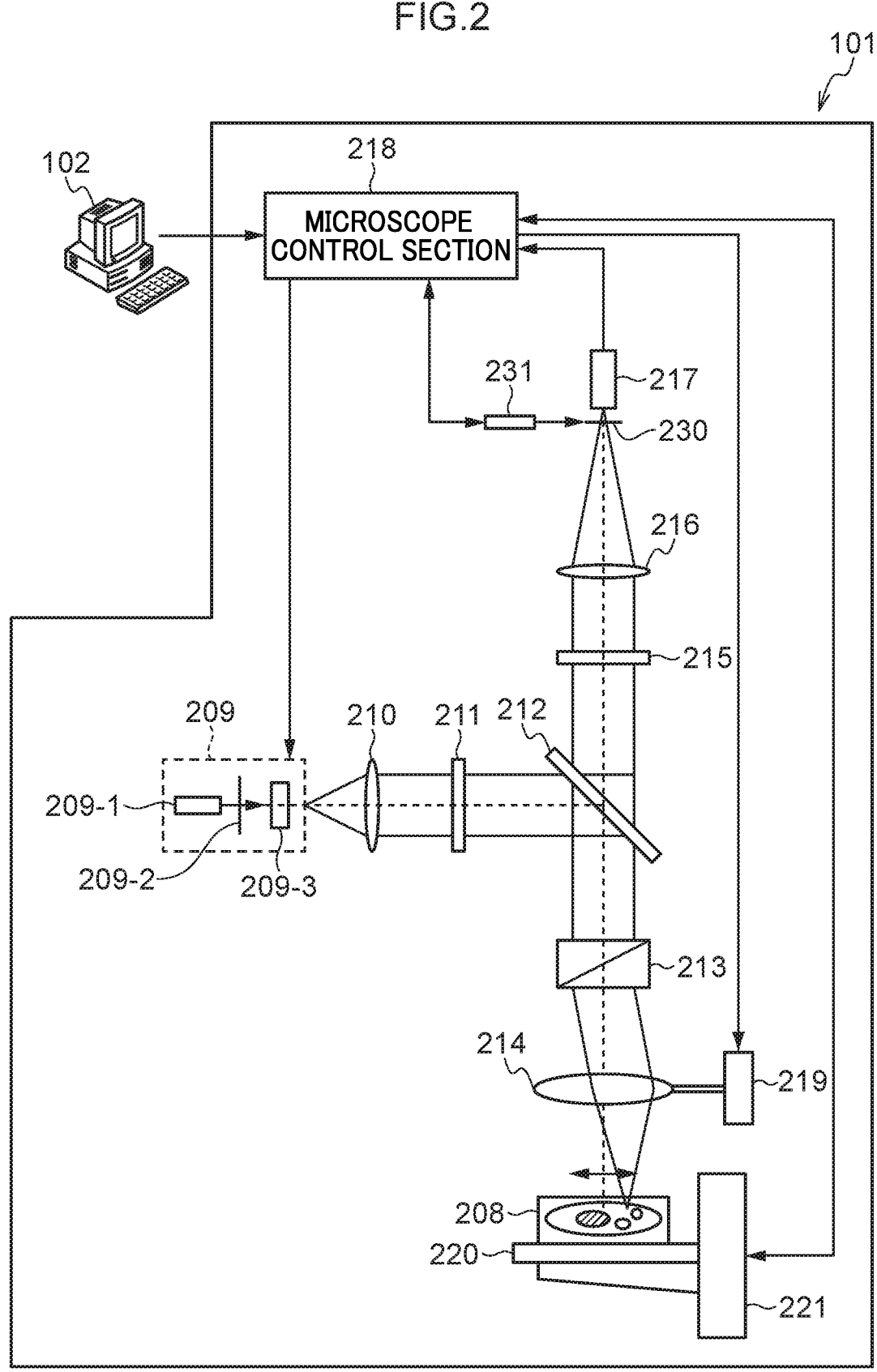
FIG. 2 is a diagram illustrating an example of a configuration of a microscope device 101.

Next, description follows regarding a configuration of the microscope device 101 for acquiring images of a sample (cells, for example) 208 placed on a stage 220 and having fluorescent dye pre-added thereto, with reference to FIG. 2. As illustrated in FIG. 2, the microscope device 101 includes a light source section 209, an illumination lens 210, an excitation filter 211, and a dichromic mirror 212. The light source section 209 is configured from a light source 209-1, a shutter 209-2, and an acousto-optic element 209-3. A device that emits excitation light at a specific wavelength, such as a laser beam, may be employed as the light source 209-1. The microscope device 101 includes a scanner 213 and an object lens 214 arranged at the sample 208 side of the dichromic mirror 212. As an example, a galvano scanner or a resonant scanner may be employed as the scanner 213. The microscope device 101 also includes a fluorescence filter 215, a light condensing lens 216, and a detection section 217 arranged at the opposite side of the dichromic mirror 212 to the sample 208 side. A photomultiplier tube may be employed as the detection section 217. The microscope device 101 includes a stage drive section 221 to move the stage 220 with the sample 208 placed thereon in a horizontal plane. Note that the stage drive section 221 may also be configured to move the stage 220 in an optical axis direction of the object lens 214. The microscope device 101 also includes a pinhole 230 and a pinhole drive section 231 for adjusting the size of the pinhole 230. The pinhole 230 is arranged at a light incident side of the detection section 217, is arranged at a conjugate position to a focal plane of the sample, and, by the diameter of the pinhole 230, removes light from positions in the optical axis direction displaced from the focal plane by a given displacement or greater. The microscope device 101 also includes a microscope control section 218 to control operation of the plural configuration sections that operate to acquire images, such as, for example, the light source section 209, the pinhole drive section 231, the stage drive section 221, and the scanner 213.

The sample 208 is an example of an "object" of technology disclosed herein. The light source 209-1 is an example of a "light source" of technology disclosed herein. The illumination lens 210, the excitation filter 211, the dichromic mirror 212, the scanner 213, and the object lens 214 are examples of an "illumination optical system" of technology disclosed herein. The detection section 217 is an example of a "detection section" of technology disclosed herein. The microscope control section 218 is an example of an "image generation section" of technology disclosed herein.

Next, description follows regarding relevant configuration of electrical systems of the devices in the microscope system, with reference to FIG. 3A to 3B. As illustrated in FIG. 3A, the microscope device 101 is equipped with the microscope control section 218. The microscope control section 218 is configured by a computer including a central processing unit (CPU) 302, read only memory (ROM) 304, random access memory (RAM) 306, and a secondary storage device 308. Each of the programs described later (programs of FIG. 5, FIG. 10, FIG. 13, FIG. 17, and FIG. 22 executed by the microscope control section 218) are stored in the ROM 304. The CPU 302 reads each of the programs (programs of FIG. 5, FIG. 10, FIG. 13, FIG. 17, and FIG. 22 executed by the microscope control section 218) from the ROM 304, expands these programs into the RAM 306, and then executes the programs. The microscope device 101 includes the light source section 209, the detection section 217, an input device 310, a display device 314, the pinhole drive section 231 for adjusting the size of the pinhole 230, the stage drive section 221 to move the stage 220, and a transceiver device 316 for exchanging data with the information processing device 102. The sections illustrated in FIG. 3A of the microscope device 101 are mutually connected together by a bus 320.

As illustrated in FIG. 3B, the information processing device 102 includes a CPU 402, ROM 404, RAM 406, a secondary storage device 408, a transceiver device 410 for exchanging data with the server 104 over the network 103, a transceiver device 416 for exchanging data with the microscope device 101, an input device 412, and a display device 414. Each of the sections illustrated in FIG. 3B of the information processing device 102 are mutually connected together by a bus 420. Each of the programs described later (programs of FIG. 5, FIG. 10, FIG. 13, FIG. 17, FIG. 22, and FIG. 32 executed by the information processing device 102, and programs of FIG. 25, FIG. 27, and FIG. 28) is stored in the ROM 404. The CPU 402 reads each of the programs (programs of FIG. 5, FIG. 10, FIG. 13, FIG. 17, FIG. 22, and FIG. 32 executed by the information processing device 102, and programs of FIG. 25, FIG. 27, and FIG. 28) from the ROM 404, expands the programs into the RAM 406, and executes the programs.

As illustrated in FIG. 3C, the server 104 includes a CPU 502, a ROM 504, RAM 506, a secondary storage device 508, a transceiver device 512 for exchanging data with the information processing device 102 over the network 103, a display device 514, and an input device 516. Each of the sections illustrated in FIG. 3C of the server 104 are mutually connected together by a bus 520. Each of the programs described later (the programs of FIG. 15, FIG. 19, and FIG. 29, and the program of FIG. 32 executed by the server 104) is stored in the ROM 504. The CPU 502 reads each of the programs (programs of FIG. 15, FIG. 19, and FIG. 29 and the program of FIG. 32 executed by the server 104) from the ROM 504, expands the programs into the RAM 506, and executes the programs.

A graphics processing unit (GPU) and field programmable gate arrays (FPGA) may be employed instead of the CPUs 302, 402, 502. For example, a hard disk drive (HDD), flexible disk, magneto-optical disk, flash memory or the like may be employed as the secondary storage devices 308, 408, 508.

Figure 4A:
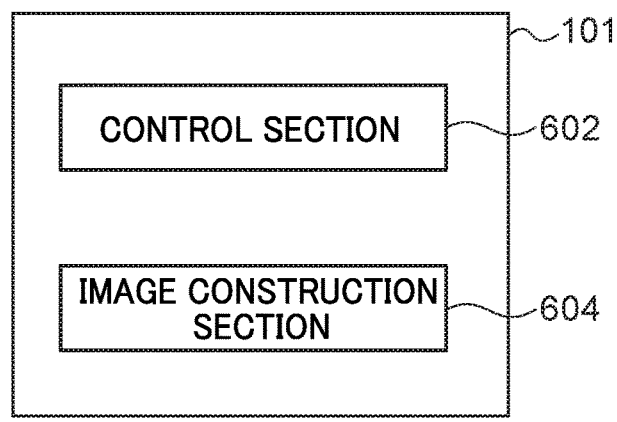
FIG. 4A is a functional block diagram illustrating an example of relevant functions of the microscope device 101 according to the first exemplary embodiment.
Figure 4B:
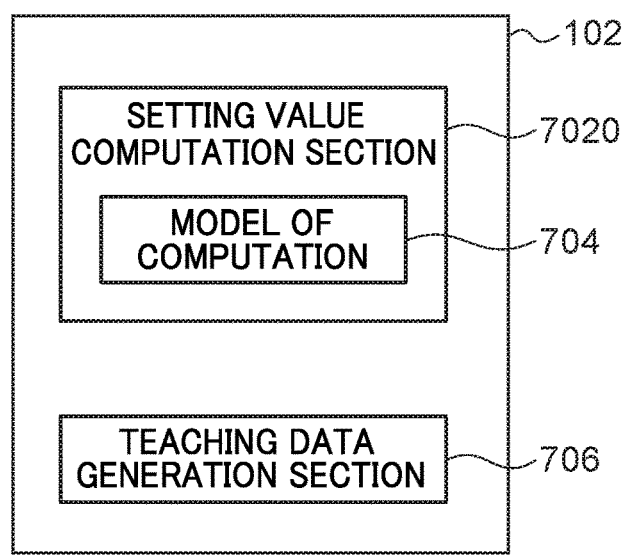
FIG. 4B is a functional block diagram illustrating an example of relevant functions of the information processing device 102 according to the first exemplary embodiment.
Figure 4C:
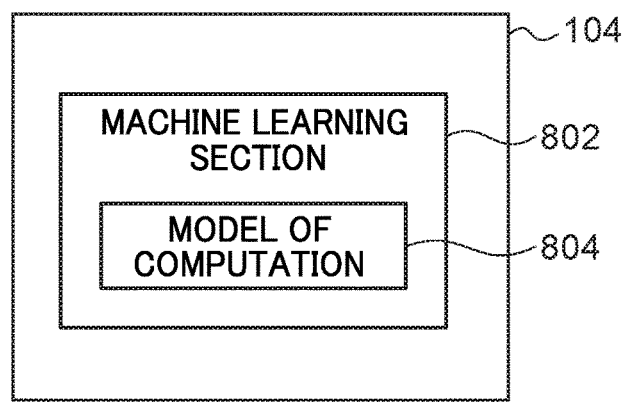
FIG. 4C is a functional block diagram illustrating an example of relevant functions of the server 104 according to the first exemplary embodiment.

Next, description follows regarding functions of each of the devices of the microscope system, with reference to FIG. 4A to FIG. 4C. As illustrated in FIG. 4A, the microscope device 101 includes a control section 602 and an image construction section 604. The CPU 302 executes each of the programs (programs of FIG. 5, FIG. 10, FIG. 13, FIG. 17, and FIG. 22 executed by the microscope control section 218), and the CPU 302 accordingly functions as the control section 602 and the image construction section 604.

As illustrated in FIG. 4B, the information processing device 102 includes a setting value computation section 7020 including a model of computation 704, and a teaching data generation section 706. The CPU 402 executes each of the programs (programs of FIG. 5, FIG. 10, FIG. 13, FIG. 17, FIG. 22, and FIG. 32 executed by the information processing device 102, and programs of FIG. 25, FIG. 27, and FIG. 28), and the CPU 402 accordingly functions as the setting value computation section 7020 and the teaching data generation section 706.

Note that the teaching data generation section 706 illustrating an example of a "teaching image generation section" of technology disclosed herein.

The model of computation 704 is an example of a "model of computation" of technology disclosed herein. The setting value computation section 7020 is an example of a "decision section" of technology disclosed herein.

As illustrated in FIG. 4C, the server 104 is equipped with a machine learning section 802 including a model of computation 804. Although described in detail later, briefly the server 104 updates the model of computation 804 based on teaching data transmitted from the information processing device 102, and transmits the updated model of computation 804 to the information processing device 102. The information processing device 102 stores the model of computation received from the server 104 in the setting value computation section 7020, substituting for the existing model of computation 704. The CPU 502 executes each of the programs (programs of FIG. 15, FIG. 19, and FIG. 29 and programs executed by the server 104 of FIG. 32), and the CPU 502 accordingly functions as the machine learning section 802.

The machine learning section 802 is an example of an "updating section" of technology disclosed herein.

Operation

Description next follows regarding operation of technology disclosed herein.

First an operation using the microscope device 101 to acquire an image representing the sample 208 will be described, with reference to FIG. 2. Light (excitation light) of a specific wavelength emitted from the light source section 209 passes through the illumination lens 210 and the excitation filter 211 and is incident to the dichromic mirror 212.

The dichromic mirror 212 of the present exemplary embodiment has properties that reflect the excitation light of the specific wavelength, but transmits light of wavelengths other than the specific wavelength of the excitation light. This results in the excitation light incident to the dichromic mirror 212 being reflected by the dichromic mirror 212 and being incident to the scanner 213. The scanner 213 scans the incident excitation light, and the scanned light is condensed by the object lens 214 onto the sample 208 above the stage 220. The position of the condensed light is scanned in two dimensions by the scanner 213.

The fluorescent dye has been pre-added to the sample 208, and so light (fluorescence) is accordingly generated a position on the sample 208 illuminated by the excitation light. The light (fluorescence) emitted from the sample 208 passes through the object lens 214 and the scanner 213, and is incident to the dichromic mirror 212. The light (fluorescence) incident to the dichromic mirror 212 has a different wavelength to that of the excitation light, and so is transmitted by the dichromic mirror 212, passes through the fluorescence filter 215, and is condensed by the light condensing lens 216. The condensed light (fluorescence) is incident to the detection section 217. The detection section 217 performs photoelectric conversion on the incident light, generates digital data with values corresponding to the amount of light (brightness), and transmits the generated digital data to the microscope control section 218.

The microscope control section 218 records this data as single pixel data in the RAM 306 provided to the microscope control section 218. This recording is synchronized to the timing of the two dimensional scanning of the scanner 213 and the synchronized data is arranged to generate a single image such that an image is acquired thereby.

The microscope control section 218 controls the plural configuration sections that operate to acquire images, i.e. the light source section 209, the pinhole drive section 231, the stage drive section 221, and the like. Thus the microscope control section 218 sets, as an image acquisition condition, for example, an intensity of excitation light of the light source section 209, a size of the pinhole 230, a scan speed of a spot on the sample 208, etc.

The microscope control section 218 transmits the acquired image and values of the acquisition condition to the information processing device 102.

In the technology disclosed herein, a second image acquisition condition (second acquisition condition) is decided based on the first image representing the sample 208 acquired with the microscope device 101, and based on a first acquisition condition that is setting information for at least one of the configuration sections of the microscope device 101 (the light source section 209, the scanner 213, or the like) when acquiring the first image.

The second acquisition condition employed here may include a single item, however, plural specific acquisition states for acquiring a second image may be included, such as, for example, plural items that both affect the brightness of the sample 208 and also generate various different effects. For example, plural items, such as the intensity of excitation light, applied voltage, PMT offset, scan size, scan speed, and pinhole size, etc. may be included in the second image acquisition condition. The applied voltage is a value of voltage applied to the detection section 217. The PMT offset is a value representing an amount of offset (upward shift) in output current of the detection section 217. The scan size is a value representing a distance on the sample scanned by the scanner 213 in a given time (sample time). The scan speed is a value of the speed with which light is scanned by the scanner 213. The pinhole size is the size of the pinhole 230. The intensity of excitation light, applied voltage, PMT offset, scan size, scan speed, and pinhole size are examples of "items" of technology disclosed herein.

For example, the intensity of excitation light, applied voltage, scan speed, and pinhole size are all parameters that raise the brightness of an imaging image. However, at the same time as generating brightness they also cause different effects to occur, as listed in Table 1.

TABLE 1

| | Brightness | S/N Ratio | Resolution | Fluorescent Dye Fade | Imaging Time |
|---|---|---|---|---|---|
| Intensity of Excitation Light (Increase) | Increase | Increase | — | Increase | — |
| Applied Voltage (Increase) | Increase | Decrease | — | — | — |
| Scan Speed (Decrease) | Increase | — | — | — | Increase |
| Pinhole Size (Increase) | Increase | Increase | Decrease | — | — |

More specifically, as the intensity of excitation light is raised, the brightness and the S/N ratio also rises, however a rise in the intensity of excitation light also causes the progression of fluorescent dye fading in the cells of the sample 208. As the applied voltage is raised the brightness also rises, however the S/N ratio decreases. As the scan speed is lowered the brightness also rises, however the imaging time is lengthened thereby. As the pinhole size is raised the brightness and the S/N ratio also rise, however the resolution falls.

There are accordingly various disadvantages inherent in the parameters to raise brightness, making it necessary to decide on the values to set for each item by making a comprehensive determination for various evaluation items, rather than independently optimizing each single setting item.

Although described in detail later, briefly in the present exemplary embodiment a model of computation is employed to decide an acquisition condition for a second image, and the model of computation is updated (e.g. trained).

The second acquisition condition, i.e. the items mentioned above, are not limited to the intensity of excitation light, applied voltage, PMT offset, scan size, scan speed, and pinhole size. For example, the following items are also be applicable. Namely, an object lens Z coordinate, an object lens type, a line average, a line integral, and a line skip may be included in the items mentioned above.

The object lens Z coordinate is a coordinate of the object lens 214 along the optical axis direction. The object lens 214 is attached to a revolver 219 that is capable of moving along the optical axis direction, and the object lens 214 is moved in the optical axis direction by the revolver 219 being moved in the optical axis direction by the microscope control section 218. The optical axis direction coordinate of the object lens 214 can be ascertained from a position of the object lens 214 as measured by an encoder or the like.

Description follows regarding the object lens type. In the example illustrated in FIG. 2 there is a single object lens 214 provided. However, some laser scanning microscopes are laser scanning microscopes having object lenses of plural types, i.e. different magnification or the like, attached to the revolver 219. An object lens selected from out of the plural object lenses is then set on the optical axis by the revolver 219. The object lens type is determined by the magnification of the lens or the like.

Description follows regarding line average and line integral.

A line average is the number of scans performed in a case in which plural scans are performed at the same position (line) and values obtained by averaging the acquired data is employed for pixel values of that position (line). For example, in a case in which the line average is two, then scanning is performed twice at the same position (line), and the average values thereof are employed as the pixel values. A line integral is a number of scans performed in a case in which plural scans are performed at the same position (line) and values obtained by summing the acquired data are employed as pixel values for that position (line). In a case in which the line integral is two, then the sum of two scans is employed for the pixel values. These correspond to binning for a camera. Note that although description has been given here for a line shape, a task of scanning and generating an image may be performed plural times for an entire plane, and averaging or integration performed using plural sets of two dimensional data.

A line skip is a sampling width of a line unit. In a case in which the line skip is two then detection is performed every other line.

Figure 7:
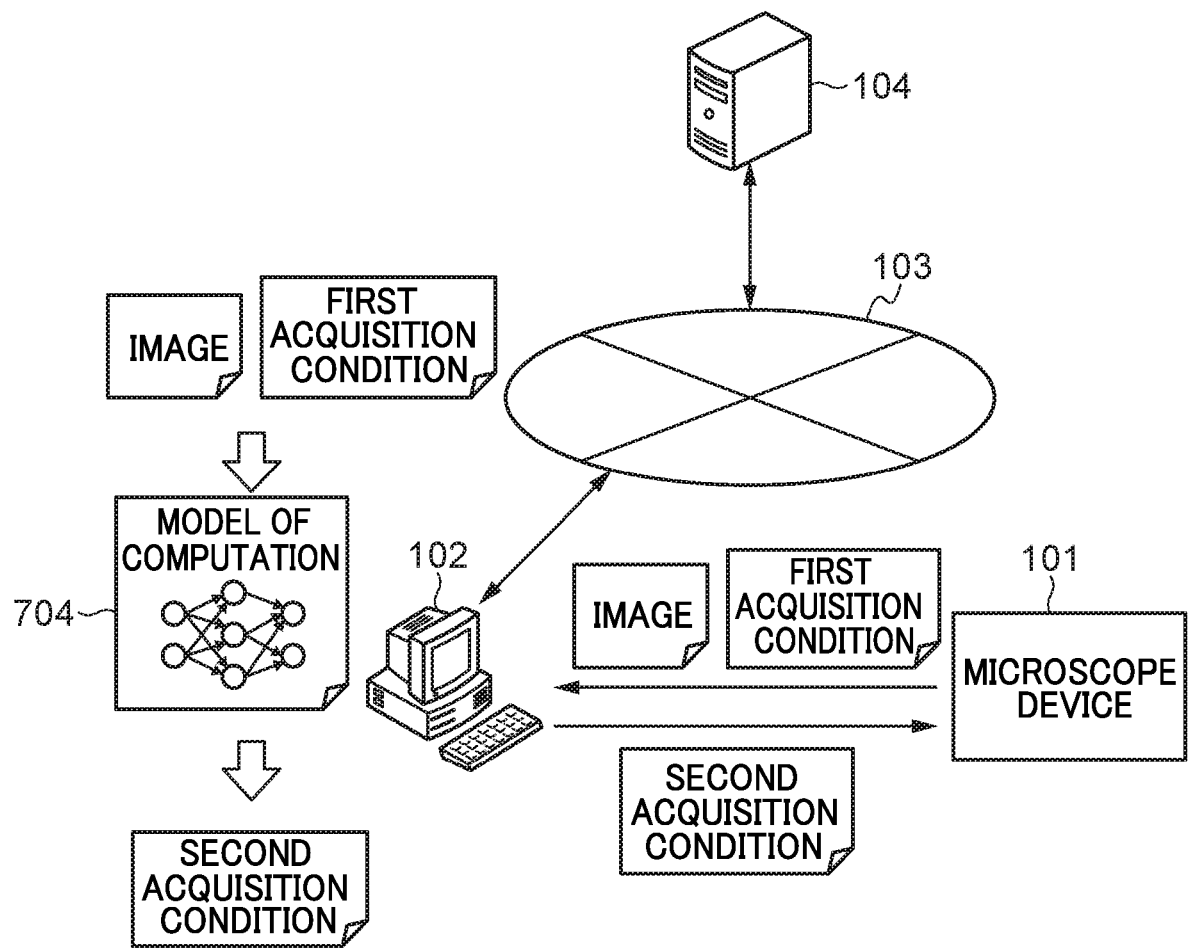
FIG. 7 is a diagram illustrating an example of a way in which data is exchanged when an image acquisition processing program is executed.

Next, description follows regarding image acquisition processing of an image acquisition processing program executed by the CPU 302 of the microscope control section 218 of the microscope device 101 and the CPU 402 of the information processing device 102, with reference to FIG. 5. FIG. 7 illustrates an example of a way in which data is exchanged when an image acquisition processing program is executed.

When a user operates the input device 412 of the information processing device 102 and an instruction to acquire a first image representing the sample 208 is input to the information processing device 102, an instruction from the information processing device 102 is input to the microscope control section 218 of the microscope device 101, and the image acquisition processing of FIG. 5 executed by the information processing device 102 is started.

When the image acquisition processing is started, at step 900 the setting value computation section 7020 of the information processing device 102 transmits, to the microscope device 101, the first condition acquisition command data to command the microscope device 101 so as to acquire the first acquisition condition i.e. setting information for the plural configuration sections of the microscope device 101 when acquiring the first image. The control section 602 of the microscope device 101 receives the first condition acquisition command data.

At step 902, the control section 602 of the microscope device 101 acquires the values of the first acquisition condition. Examples of values of the first acquisition condition include: 10, for example, as an excitation light intensity value $v_1$; 100, for example, as an applied voltage value $v_2$; 1, for example, as a scan speed value $v_3$; and 30, for example, as a pinhole size value $v_4$. At step 904, the first acquisition condition is transmitted to the information processing device 102, and the information processing device 102 receives the first acquisition condition.

At step 906, the setting value computation section 7020 of the information processing device 102 transmits, to the microscope device 101, first image imaging command data to command the microscope device 101 so as to image the first image with the first acquisition condition. The control section 602 of the microscope device 101 receives the first image imaging command data.

At step 908, the image construction section 604 of the microscope device 101 controls plural configuration sections (the light source section 209, the scanner 213, etc.) so as to acquire the first image. The first image is thereby acquired by operating to acquire an image representing the sample 208.

At step 910, the control section 602 of the microscope device 101 transmits the first image to the information processing device 102, and the information processing device 102 receives the first image.

While this will be described in detail later, briefly, at step 912, the setting value computation section 7020 of the information processing device 102 employs a model of computation 704 held in the setting value computation section 7020 (more specifically, stored in the secondary storage device 408) built from the first image and the respective values of the first acquisition condition to compute values of a second acquisition condition of the microscope device 101.

At step 914, the setting value computation section 7020 of the information processing device 102 transmits, to the microscope device 101, second condition setting command data to command the microscope device 101 so as to set the values of the second acquisition condition in the microscope device 101. The control section 602 of the microscope device 101 receives the second acquisition condition.

At step 916, the control section 602 of the microscope device 101 sets the second acquisition condition. For example, the microscope control section 218 sets the light source 209-1 such that the intensity of excitation light from the light source 209-1 is a value as instructed in the second acquisition condition. Note that the microscope control section 218 may be configured so as to set the pinhole drive section 231 such that the size of the pinhole 230 is a value as instructed in the second acquisition condition.

At step 918, the setting value computation section 7020 of the information processing device 102 transmits second image imaging command data commanding the microscope device 101 to image the second image with the second acquisition condition, and the control section 602 of the microscope device 101 receives the second image imaging command data.

At step 920, the image construction section 604 of the microscope device 101 acquires the second image under the second acquisition condition. At step 924 the image construction section 604 transmits the second image to the information processing device 102, and the information processing device 102 receives the second image and displays the second image on the display device 414.

By transmitting the second acquisition condition to the microscope device 101 in the manner described above, the microscope device 101 can be caused to acquire the second image under the second acquisition condition.

Figure 6:
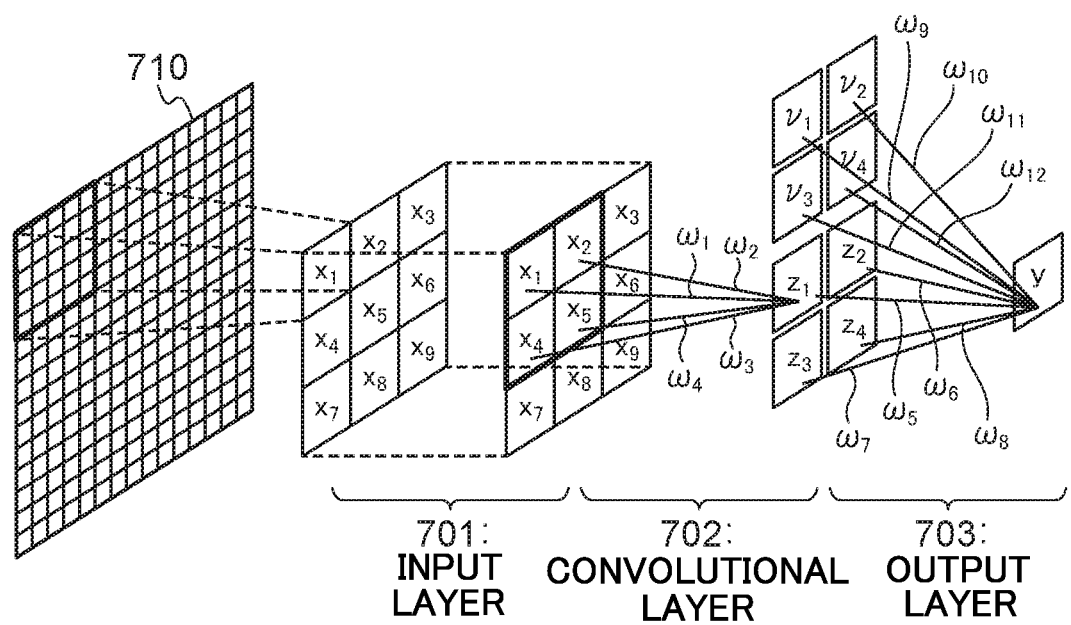
FIG. 6 is a diagram illustrating an example of specific content of a model of computation.

Next, description follows regarding processing of step 912 of FIG. 5 to compute the second acquisition condition, with reference to FIG. 6.

A multilayer neural network may be employed as an example of the model of computation 704, such as, for example, a convolutional neural network as illustrated in FIG. 6. FIG. 6 illustrates an example of a case in which a single first image 710 and four first acquisition condition values $v=(v_1, v_2, v_3, v_4)$ are employed when computing a single second acquisition condition. For example, as described above, the first acquisition condition v is set with 10 for the excitation light intensity value $v_1$, 100 for the applied voltage value $v_2$, 1 for the scan speed value $v_3$, and 30 for the pinhole size value $v_4$. As illustrated in FIG. 6, the convolutional neural network includes an input layer 701 input with data related to the first image 710, a convolutional layer 702 to perform a convolutional operation on the data related to the first image 710 that has been input to the input layer 701, and an output layer 703 to output a second image acquisition condition y from the output of the convolutional layer 702 and the respective values of the first image acquisition condition v.

The model of computation referred to here is a system for accepting one or more input signal and deciding one or more output signal. Although a neural network as described above corresponds to such a model of computation, there is no limitation to a neural network, and, for example, a linear regression model or a support vector machine may be employed therefor.

Moreover, a neural network is a model of computation for accepting one or more input signal, and employs a weight and an activation function for each of the input signals to decide the one or more output signals.

The convolutional neural network illustrated in FIG. 6 is an example of a "multilayer neural network" of technology disclosed herein. A multilayer neural network employing a fully connected layer instead of the convolutional layer 702 may also be employed. The number of layers in the neural network is also not limited to three layers, and may be plural layers including three or more layers.

In the setting value computation section 7020, the input layer 701 accepts values resulting from image processing performed on the input first image 710, for example, values $x_i$ resulting from down sampling brightness values of the first image 710.

The down sampling referred to here is, for example, performed by dividing the plural pixels of the first image 710 into plural (for example 9) individual blocks, and finding an average value, maximum value, minimum value, or the like for the brightness value of pixels in each of the blocks. In the example illustrated in FIG. 6, average values $x_1$ to $x_9$ are found for the brightness values of the pixels in the nine blocks.

The setting value computation section 7020 then uses the convolutional layer 702 to scan with a filter (for example a 2×2 filter) to perform a convolutional operation thereon. The filter has weights $\omega_1, \omega_2, \omega_3, \omega_4$, and the same weights are used in the convolutional layer 702 when scanning the filter. Thereby, for example, outputs $z_1$ to $z_4$ for the input layer 701 are computed as:

$$z_1 = f(x_1 \times \omega_1 + x_2 \times \omega_2 + x_4 \times \omega_3 + x_5 \times \omega_4 + b_1)$$

$$z_2 = f(x_2 \times \omega_1 + x_3 \times \omega_2 + x_5 \times \omega_3 + x_6 \times \omega_4 + b_1)$$

$$z_3 = f(x_4 \times \omega_1 + x_5 \times \omega_2 + x_7 \times \omega_3 + x_8 \times \omega_4 + b_1)$$

$$z_4 = f(x_5 \times \omega_1 + x_6 \times \omega_2 + x_8 \times \omega_3 + x_9 \times \omega_4 + b_1)$$

wherein $\omega_i$ (i=1, 2, 3, 4) indicates the weights, $b_1$ indicates a bias of the convolutional layer 702, and f indicates an activation function.

The setting value computation section 7020 employs the output layer 703 to accept the outputs $z_1$ to $z_4$ of the convolutional layer 702 and the first acquisition condition values $v=(v_1, v_2, v_3, v_4)$, and to compute values of the second acquisition condition y according to the following equation.

$$y = f(z_1 \times \omega_5 + z_2 \times \omega_6 + z_3 \times \omega_7 + z_4 \times \omega_8 + v_1 \times \omega_9 + v_2 \times \omega_{10} + v_3 \times \omega_{11} + v_4 \times \omega_{12} + b_2)$$

Wherein $\omega_p$ (p=5 to 12) indicate weights, $b_2$ indicates a bias of the output layer 703, and f indicates an activation function.

The first acquisition condition values $v=(v_1, v_2, v_3, v_4)$ are respective values for the excitation light intensity, applied voltage, scan speed, and pinhole size, as described above. The second acquisition condition y is a value of excitation light intensity.

In the present exemplary embodiment as described above, the second image acquisition condition (second acquisition condition) is decided based on the first image and based on the first image acquisition condition (first acquisition condition). When comparing the present exemplary embodiment to an example in which the second acquisition condition is decided from the first image, the present exemplary embodiment is different therefrom in that the second acquisition condition is decided by also considering the first acquisition condition. The present exemplary embodiment enables acquisition of a second image of higher quality than a second image of the example not considering the first acquisition condition.

This thereby enables setting of an acquisition condition to acquire the second image of higher image quality even without a user having a thorough operational knowledge of the microscope device 101.

Moreover, the present exemplary embodiment also enables the excitation light intensity that is an acquisition condition to be set automatically, a feat that has not hitherto been achieved automatically.

MODIFIED EXAMPLES

Description next follows regarding a first modified example to a sixth modified example of the first exemplary embodiment. The first modified example to the sixth modified example are substantially the same as the first exemplary embodiment, and the first modified example to the sixth modified example will now be described with reference to portions thereof that differ from the first exemplary embodiment.

First Modified Example

In the first exemplary embodiment, the second acquisition condition value y is one of the values in the first acquisition condition values $v=(v_1, v_2, v_3, v_4)$. In the technology disclosed herein, the second acquisition condition value y may also be a value other than the first acquisition condition values $v=(v_1, v_2, v_3, v_4)$. In the example described above, for example, a value such as scan size or the like may be employed therefor.

Second Modified Example

In the first exemplary embodiment down sampling is performed as the image processing performed on the first image 710 input to the input layer 701. However, technology disclosed herein is not limited thereto, and, for example, another type of image processing may be applied, such as image normalization, image reflection, or the like.

Third Modified Example

In the first exemplary embodiment, a single value (for example excitation light intensity value) in the second acquisition condition is decided based on the first image and the first acquisition condition values. However, technology disclosed herein is not limited thereto, and, for example, plural values in the second acquisition condition may be decided based on the first image and the first acquisition condition values.

As illustrated above in Table 1, plural second acquisition conditions may include plural items that not only affect the respective specific acquisition state (for example, the brightness of the sample 208) when acquiring the second image but also generate various different effects.

For example, plural items from out of the first acquisition condition may be applied as plural items in the second image acquisition condition. Moreover, plural items other than those of the first acquisition condition may be applied as plural items of the second acquisition condition. Furthermore, one or more items from out of the first acquisition conditions and one or more items from out of the plural items other than those of the first acquisition condition may be applied therefor.

Figure 8A:
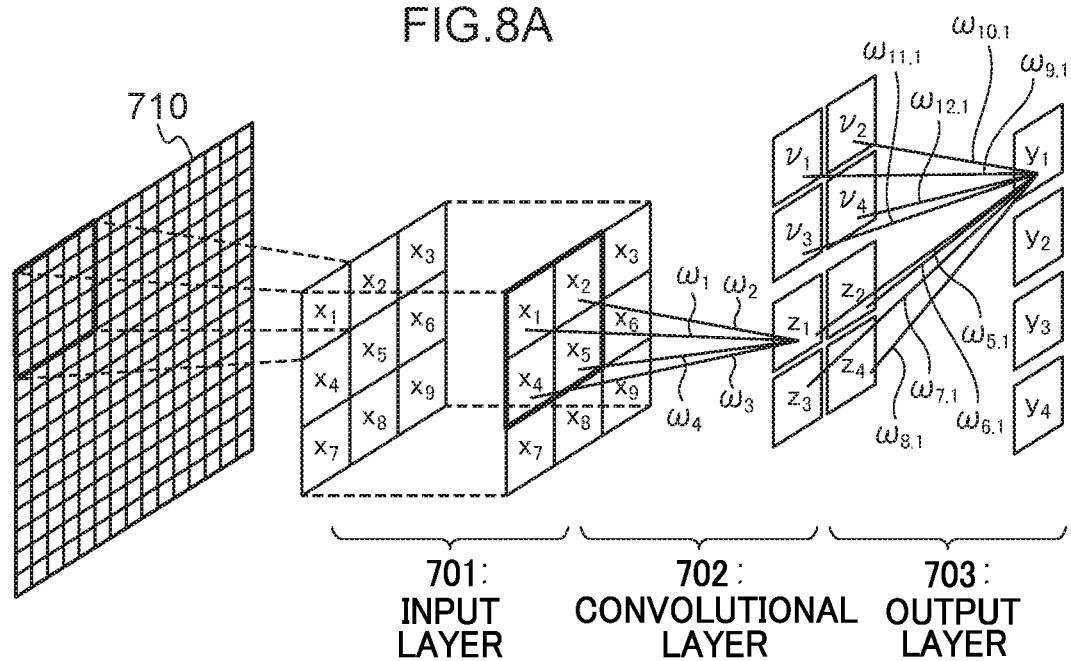
FIG. 8A is a diagram illustrating an example of specific content of a model of computation for a case in which plural second acquisition conditions are determined.

Description next follows regarding specific content of a model of computation for a case in which plural second acquisition condition values are decided, with reference to FIG. 8A. The input layer 701 and the convolutional layer 702 of FIG. 8A are similar to those of the example illustrated in FIG. 6. However, the output layer 703 of FIG. 8A decides values for plural second acquisition conditions, for example, computing four values of an acquisition condition in the following manner.

$$y_1 = f(z_1 \times \omega_{5,1} + z_2 \times \omega_{6,1} + z_3 \times \omega_{7,1} + z_4 \times \omega_{8,1} + v_1 \times \omega_{9,1} + v_2 \times \omega_{10,1} + v_3 \times \omega_{11,1} + v_4 \times \omega_{12,1} + b_2)$$

$$y_2 = f(z_1 \times \omega_{5,2} + z_2 \times \omega_{6,2} + z_3 \times \omega_{7,2} + z_4 \times \omega_{8,2} + v_1 \times \omega_{9,2} + v_2 \times \omega_{10,2} + v_3 \times \omega_{11,2} + v_4 \times \omega_{12,2} + b_2)$$

$$y_3 = f(z_1 \times \omega_{5,3} + z_2 \times \omega_{6,3} + z_3 \times \omega_{7,3} + z_4 \times \omega_{8,3} + v_1 \times \omega_{9,3} + v_2 \times \omega_{10,3} + v_3 \times \omega_{11,3} + v_4 \times \omega_{12,3} + b_2)$$

$$y_4 = f(z_1 \times \omega_{5,4} + z_2 \times \omega_{6,4} + z_3 \times \omega_{7,4} + z_4 \times \omega_{8,4} + v_1 \times \omega_{9,4} + v_2 \times \omega_{10,4} + v_3 \times \omega_{11,4} + v_4 \times \omega_{12,4} + b_2)$$

wherein $\omega_{s,t}$ (s=5, 6, 7, 8; t=1, 2, 3, 4) are weights, $b_2$ is a bias of the output layer 703, and f indicates an activation function.

As described above, in a third modified example, based on the model of computation, values of a second acquisition condition are decided for plural items that affect a specific acquisition state when acquiring respective second images and that also generate various different effects. Thus the respective values of the second acquisition condition for the plural items consider the effects on other second acquisition conditions, and can be decided in a comprehensive manner.

Moreover, the third modified example enables the acquisition condition to be decided in a comprehensive manner in consideration of the effect on other acquisition conditions, a feat that has not hitherto been achieved automatically.

Fourth Modified Example

In the first exemplary embodiment, down sampling, image normalization, image reflection, or other image processing is performed on the first image 710 input to the input layer 701. However, the technology disclosed herein is not limited thereto, and the first image 710 may be input as is, without the image processing described above being performed thereon.

Figure 8B:
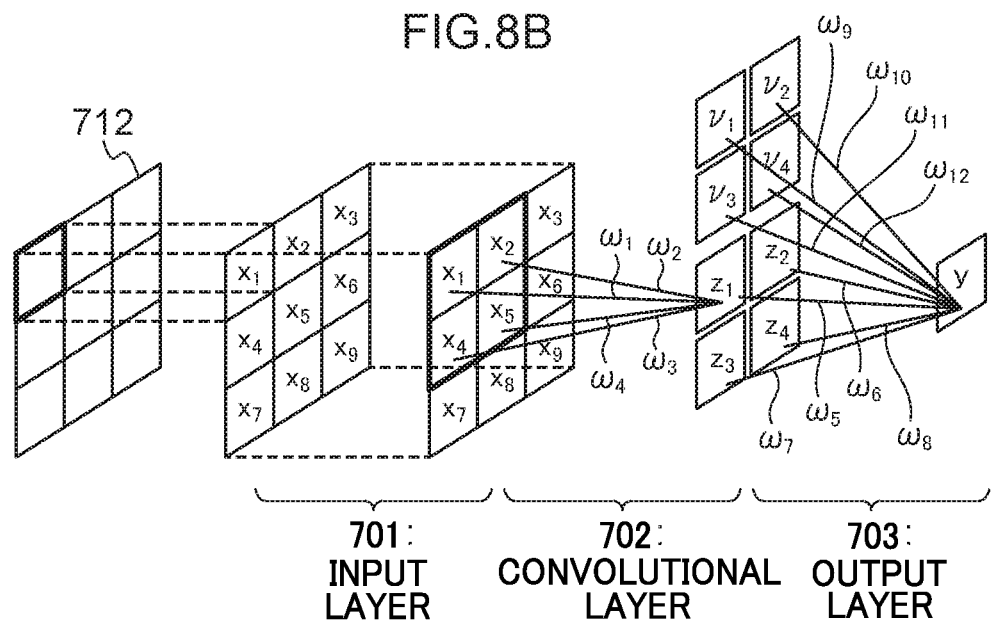
FIG. 8B is a diagram illustrating an example of a model of computation for a case in which a first image 712 is input as is, without being subjected to image processing.

FIG. 8B illustrates an example of a case in which the first image 710 is input as is, without performing the image processing described above thereon.

For example, the example illustrated in FIG. 6 illustrates an example of a case in which a 5×5 region is down sampled to $x_1$. In contrast thereto, in FIG. 8B a single pixel value of the first image 712 (3×3) corresponds to $x_1$ as is.

Fifth Modified Example

Figure 8C:
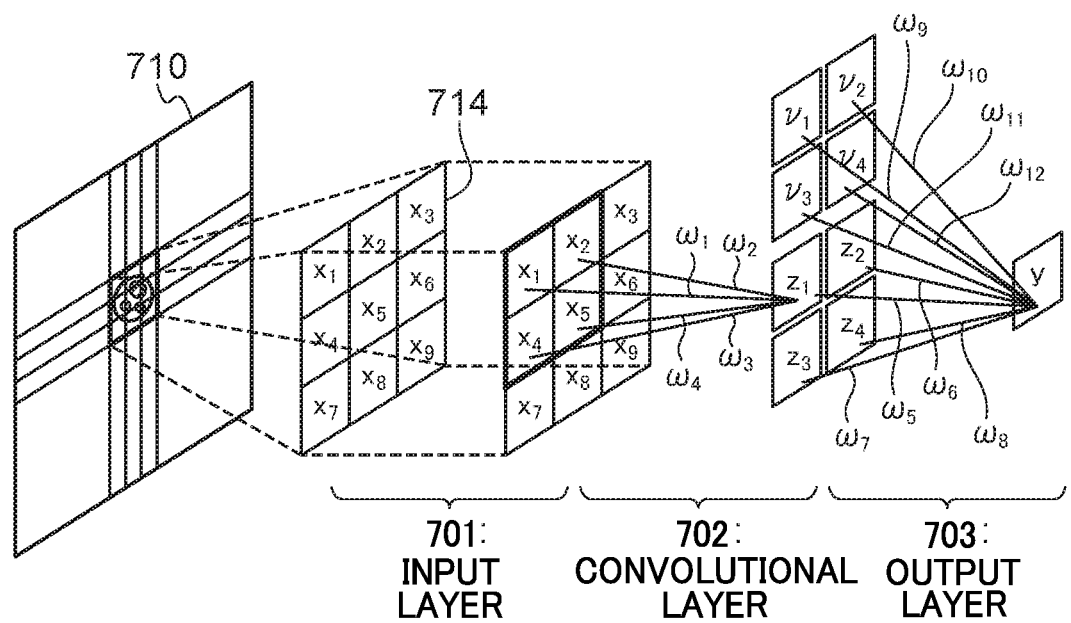
FIG. 8C is a diagram illustrating an example of a model of computation for a case in which an image of only a region of a sample 208 is input to an input layer 701.

In the first exemplary embodiment, all of the pixels of the first image are utilized. However, the technology disclosed herein is not limited thereto, and a configuration may be adopted in which an image 714 of merely a region (ROI) of the first image 710 is extracted, as illustrated in FIG. 8C, so as to be input to the input layer 701. Note that the image 714 may be subjected to the image processing described above.

A sixth modified example will be described later.
Teaching Data Generation Processing, Model-of-Computation Update Processing Employing Teaching Data
Teaching Data Generation Processing Next teaching data generation processing and model-of-computation update processing employing teaching data will be described for the first exemplary embodiment. First description follows regarding the teaching data generation processing.

Firstly, description follows regarding a first example of user mediated teaching data generation that includes a single setting value (self-determined a right by a user) using a user interface.

A user interface will now be described, with reference to FIG. 9. The user interface is displayed on a display screen 1800 of the display device 414 of the information processing device 102 and is employed for generating the teaching data.

Figure 9:
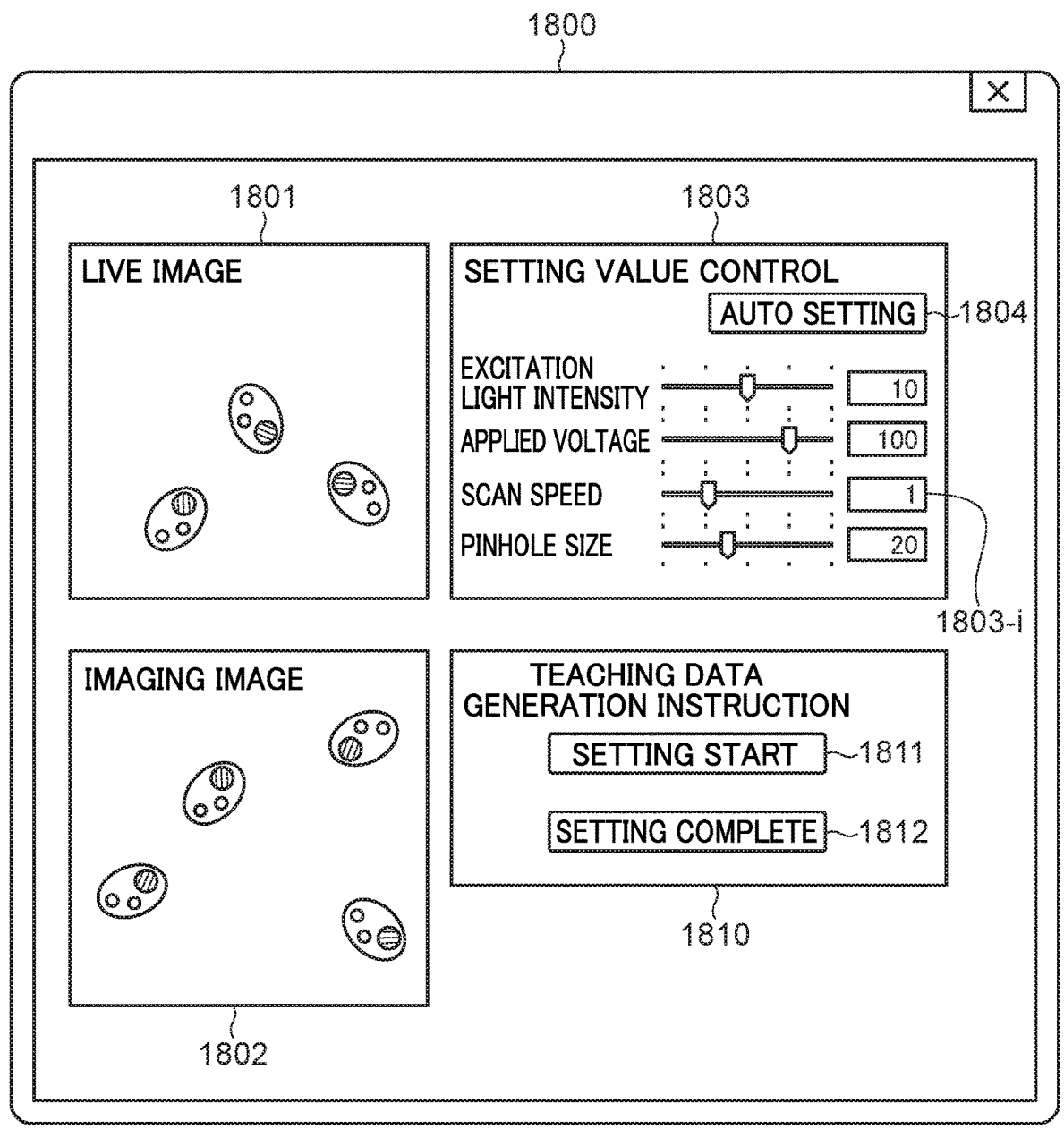
FIG. 9 is a diagram illustrating an example of a user interface for generating teaching data, as displayed on a display screen 1800 of a display device 414 of the information processing device 102.

As illustrated in FIG. 9, a Live image display section 1801, an imaging image display section 1802, a setting value control section 1803, and a teaching data generation instruction section 1810 are included on the user interface screen, as displayed on the display screen 1800 of the display device 414 of the information processing device 102. The setting value control section 1803 includes plural slider bars 1803-i for changing input numerical values by sliding a knob to set respective values for plural first acquisition conditions, and includes an auto setting button 1804. A setting start button 1811 and a setting complete button 1812 are also included in the teaching data generation instruction section 1810.

Figure 10:
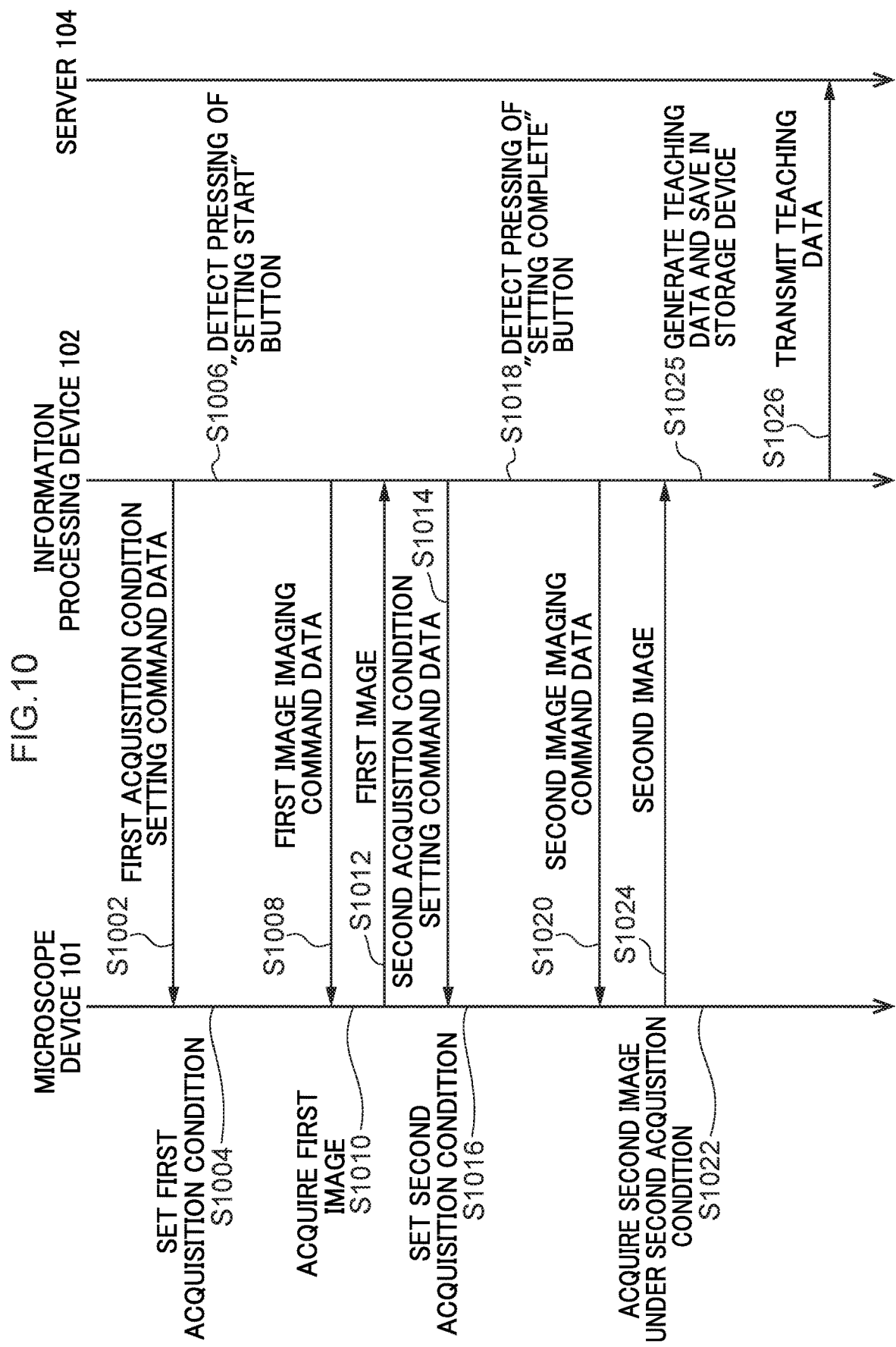
FIG. 10 is a diagram illustrating an example of a task sequence when a teaching data generation processing program is executed by the CPU 302 of the microscope control section 218 of the microscope device 101 and the CPU 402 of the information processing device 102.

Next, description follows regarding a teaching data generation processing program executed by the CPU 302 of the microscope control section 218 of the microscope device 101 and by the CPU 402 of the information processing device 102, with reference to FIG. 10. When the teaching data generation processing is started, at step 1002 the teaching data generation section 706 of the information processing device 102 transmits, to the microscope device 101, first acquisition condition setting command data to command the microscope device 101 so as to set plural (for example, four) acquisition conditions for acquiring the first image. More specifically, the user manipulates knobs on the slider bars 1803-i of the setting value control section 1803. For example, the knobs on the slider bars 1803-i are moved so that the excitation light intensity is 10, the applied voltage is 100, the scan speed is 1, and the pinhole size is 20. These values are then input to the teaching data generation section 706 through the input device 412, and stored in the RAM 406. Four individual acquisition conditions are accordingly set thereby. The first acquisition condition setting command data including these acquisition condition values (excitation light intensity value of 10; applied voltage value of 100; scan speed value of 1, and pinhole size value of 20) are transmitted to the microscope device 101 to command the microscope device 101 so as to set these values. The control section 602 of the microscope device 101 receives the first acquisition condition setting command data.

At step 1004, the control section 602 of the microscope device 101 sets the values of the first acquisition condition. More specifically, the control section 602 controls each of the sections (209, 217, 213, 231) so as to set the excitation light intensity value 10, the applied voltage value 100, the scan speed value 1, and the pinhole size value 20.

When a user presses the "setting start" button 1811 of the display screen 1800, as illustrated in FIG. 9, of the display device 414 of the information processing device 102, at step 1006 the teaching data generation section 706 of the information processing device 102 detects pressing of the "setting start" button 1811.

At step 1008, the teaching data generation section 706 transmits, to the microscope device 101, the first image imaging command data to command the microscope device 101 so as to image the first image at the first acquisition condition values, and the control section 602 of the microscope device 101 receives the first image imaging command data.

At step 1010, the image construction section 604 of the microscope device 101 acquires the first image under the first acquisition condition values, and at step 1012, the first image is transmitted to the information processing device 102, and the information processing device 102 receives the first image.

At step 1014, the teaching data generation section 706 of the information processing device 102 transmits, to the microscope device 101, second acquisition condition setting command data to set the second acquisition condition. More specifically, the first image is displayed in the Live image display section 1801 of FIG. 9, and the user sets a value of the second acquisition condition of the microscope device 101 by moving one of the knobs of the setting value control section 1803 while viewing the Live image. The value represented by the knob is transmitted to the microscope device 101 as the knob is moved. The above processing is repeated while the knob is being moved. The user decides, by their own determination, the most appropriate value (for example, an excitation light intensity of 8) for the second image acquisition condition while viewing the first image displayed on the Live image display section 1801. The second acquisition condition setting command data including the excitation light intensity value of 8, applied voltage value of 100, scan speed value of 1, and pinhole size value of 20 is transmitted, and the second acquisition condition setting command data is received by the microscope.

The user presses the "setting complete" button 1812. At step 1018, the teaching data generation section 706 of the information processing device 102 detects the pressing of the "setting complete" button 1812, and at step 1020 the teaching data generation section 706 transmits, to the microscope device 101, the second image imaging command data to command acquisition of the second image under the second acquisition condition, and the control section 602 of the microscope device 101 receives the second image imaging command data.

At step 1022, the image construction section 604 of the microscope device 101 acquires the second image under the values of the second acquisition condition (excitation light intensity value of 8; applied voltage value of 100; scan speed value of 1; and pinhole size value of 20), and at step 1024 transmits the second image to the information processing device 102, and the information processing device 102 receives the second image.

Figure 11:
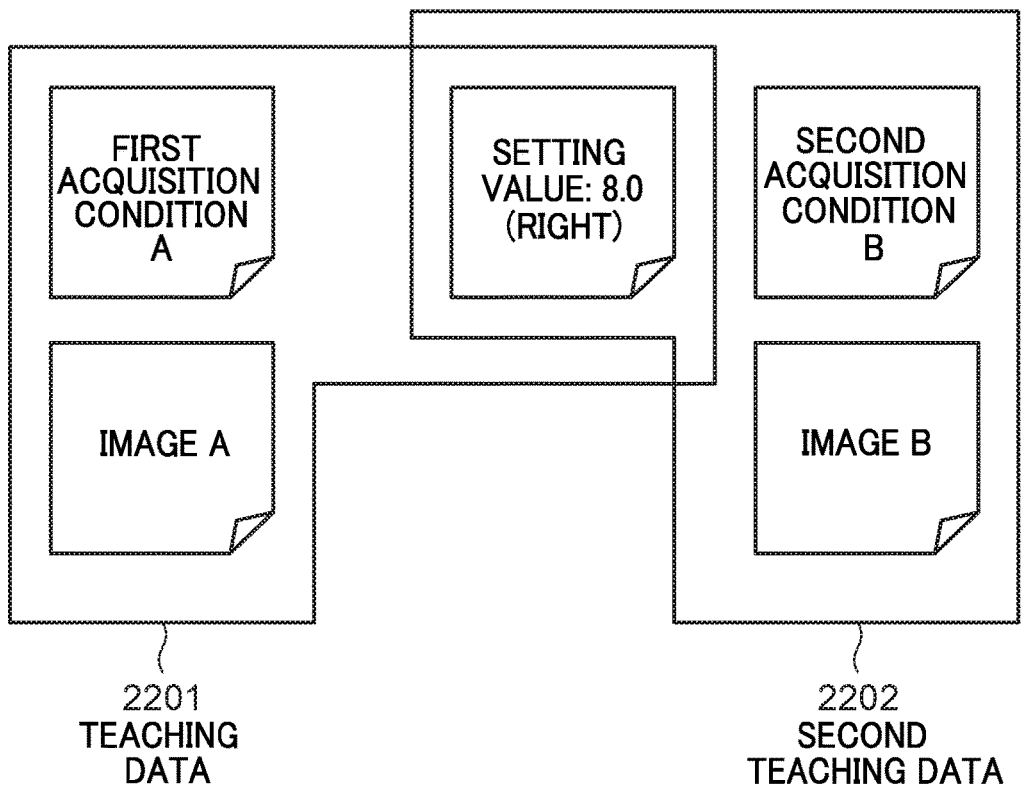
FIG. 11 is a diagram illustrating two sets of teaching data.

At step 1025, the teaching data generation section 706 generates teaching data, and saves the teaching data in the secondary storage device 408. More specifically, as illustrated in FIG. 11, two sets of teaching data {image (input), acquisition condition, setting value (right)} are generated and stored in the secondary storage device 408. The two sets of teaching data include first teaching data 2201 including {a first image A, a first acquisition condition A, and an excitation light intensity of 8 (one setting value: right)}, and second teaching data 2202 configured by {a second image B, a second acquisition condition B, and an excitation light intensity of 8 (one setting value: right)}.

Note that the first image A and the second image B are examples of "teaching images" of technology disclosed herein.

At step 1026, the teaching data generation section 706 of the information processing device 102 transmits the teaching data (two sets of teaching data 2201, 2202) to the server 104. Note that although described in detail later, briefly the server 104 utilizes the teaching data to update the model of computation (by utilization at step 2802 of FIG. 15).

Description next follows regarding a second example of user mediated generation of teaching data that includes a single setting value (self-determined as right by a user) using a user interface.

Figure 12:
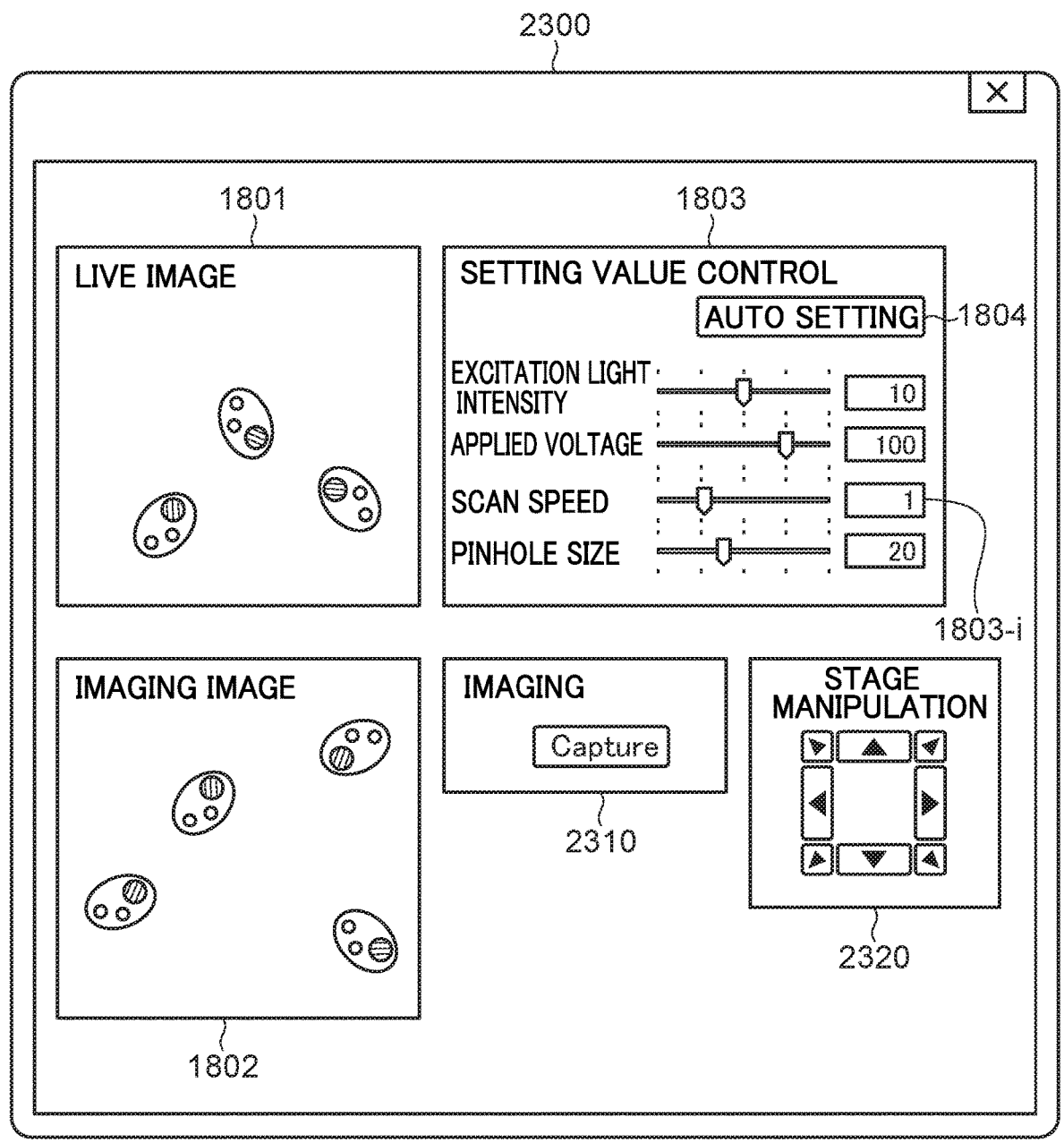
FIG. 12 is a diagram illustrating an example of a user interface for generating teaching data, as displayed on a display screen 2300 of a display device 414 of the information processing device 102.

Description follows regarding a user interface for generating teaching data, with reference to FIG. 12, as displayed on a display screen 2300 of the display device 414 of the information processing device 102. As illustrated in FIG. 12, the user interface screen displayed on the display screen 2300 of the display device 414 of the information processing device 102 includes a Live image display section 1801, an imaging image display section 1802, and a setting value control section 1803 similar to those of the first example. The teaching data generation instruction section 1810 is not included in the second example of a user interface screen. However, a capture button 2310, and a stage manipulation section 2320 for inputting an instruction to move the stage 220 with the sample 208 placed thereon (see FIG. 2) are included therein.

Figure 13:
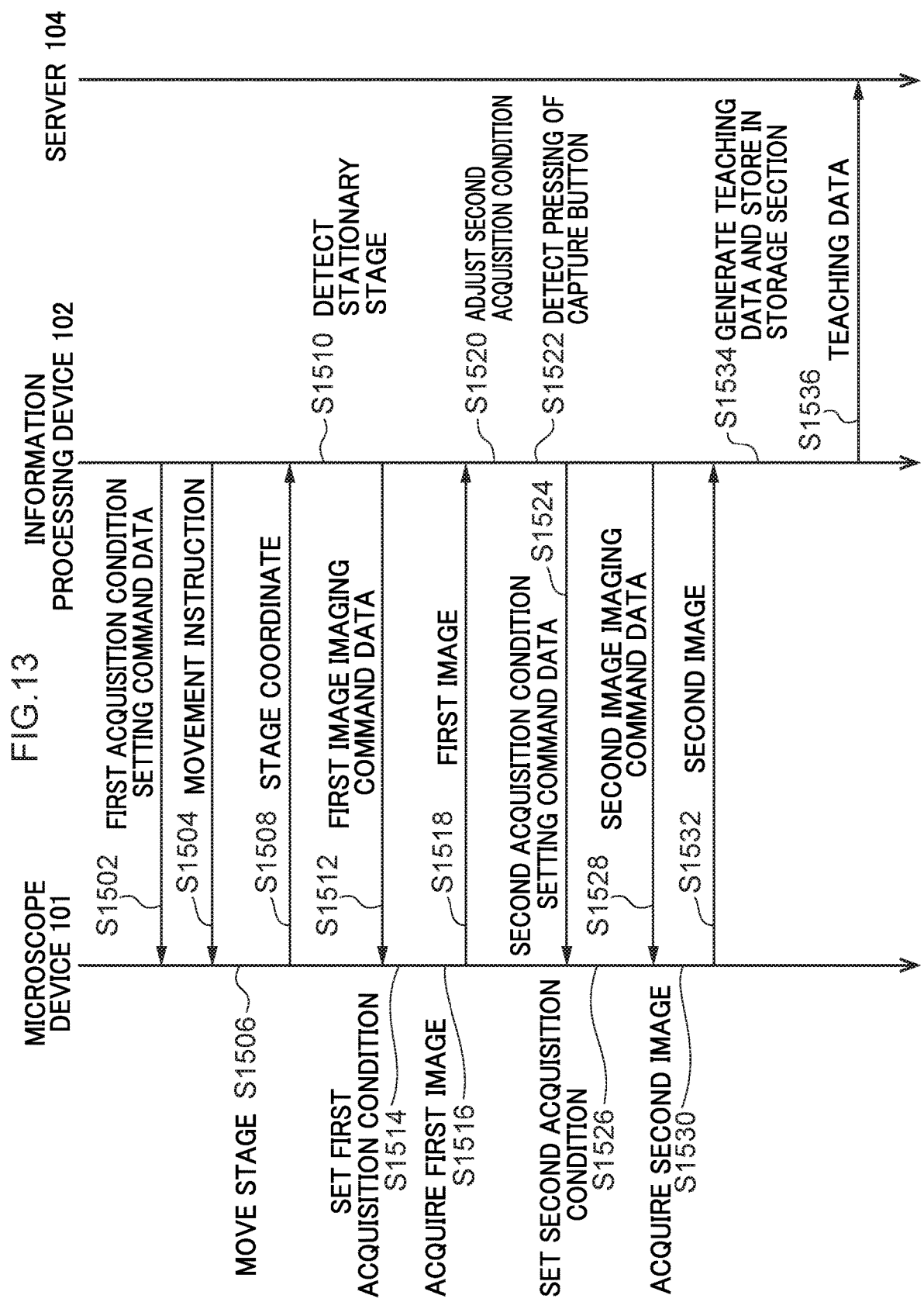
FIG. 13 is a diagram illustrating an example of a task sequence when a teaching data generation processing program is executed by the CPU 302 of the microscope control section 218 of the microscope device 101 and the CPU 402 of the information processing device 102.

Description next follows regarding teaching data generation processing executed by the CPU 302 of the microscope control section 218 of the microscope device 101 and by the CPU 402 of the information processing device 102, with reference to FIG. 13. When the teaching data generation processing is started, similarly to in the first example, at step 1502 the teaching data generation section 706 of the information processing device 102 transmits, to the microscope device 101, first acquisition condition setting command data to command the microscope device 101 so as to set a first acquisition condition (excitation light intensity of 10, applied voltage of 100, scan speed of 1, pinhole size of 20), and the control section 602 of the microscope device 101 receives the first acquisition condition setting command data. At step 1504, the teaching data generation section 706 of the information processing device 102 transmits, to the microscope device 101, movement instruction command data to instruct the microscope device 101 to move the position of the stage 220 such that the observation target of the sample 208 (cells) reaches the optical axis center of the object lens 214, and the control section 602 of the microscope device 101 receives the movement instruction command data.

At step 1506, while moving the position of the stage 220 as instructed by the movement instruction command data, the control section 602 of the microscope device 101 periodically (for example, every second) transmits coordinates of the stage 220 to the information processing device 102 at step 1508, and stops transmitting the coordinates of the stage 220 when the observation target sample 208 (cells) have reached the optical axis center.

When the coordinates of the stage are being transmitted, the teaching data generation section 706 of the information processing device 102 detects that the stage 220 has become stationary at step 1510 by detecting the cessation of transmission of the stage coordinates.

At step 1512, the teaching data generation section 706 of the information processing device 102 transmits, to the microscope device 101, first image imaging command data to command the microscope device 101 so as to acquire the first image under the values of the first acquisition condition (excitation light intensity value of 10; applied voltage value of 100; scan speed value of 1; and pinhole size value of 20), and the control section 602 of the microscope device 101 receives the first image imaging command data.

The control section 602 of the microscope device 101 sets the first acquisition condition at step 1514, the image construction section 604 acquires the first image under the first acquisition condition values at step 1516, transmits the first image to the information processing device 102 at step 1518, and the teaching data generation section 706 of the information processing device 102 receives the first image.

The teaching data generation section 706 of the information processing device 102 executes second acquisition condition adjustment processing at step 1520. More specifically, the first image is displayed in the Live image display section 1801, and the user sets a single first acquisition condition of the microscope device 101 by moving a knob of the setting value control section 1803 while viewing the Live image. The value represented by the knob is transmitted to the microscope device 101 as the knob is moved. By repeating the processing described above, the user decides by self-determination the most appropriate value (for example, an excitation light intensity of 8) in the second image acquisition condition while viewing the first image displayed on the Live image display section 1801, and the user presses the "Capture" button 2310. At step 1522, the teaching data generation section 706 of the information processing device 102 detects pressing of the "Capture" button 2310, and at step 1524 the teaching data generation section 706 transmits, to the microscope device 101, second acquisition condition setting command data to command the microscope device 101 so as to set the values of the second acquisition condition (excitation light intensity value of 8; applied voltage value of 100; scan speed value of 1; and pinhole size value of 20), and the control section 602 of the microscope device 101 receives the second acquisition condition setting command data. The control section 602 of the microscope device 101 sets the second acquisition condition values at step 1526.

At step 1528 the teaching data generation section 706 of the information processing device 102 transmits the second image imaging command data to command the microscope device 101 to image the second image under the second acquisition condition values, and the control section 602 of the microscope device 101 receives the second image imaging command data. At step 1530 the image construction section 604 acquires the second image under the second acquisition condition values, and at step 1532 the second image is transmitted to the information processing device 102 and the teaching data generation section 706 of the information processing device 102 receives the second image.

At step 1534, the teaching data generation section 706 generates teaching data as illustrated in FIG. 11, and saves the teaching data in the secondary storage device 408. Specifically, two sets of teaching data {image (input), acquisition condition, setting value (right)} are generated and stored in the RAM 406. More specifically, the two sets of teaching data include firstly first teaching data 2201 configured from {a first image A, a first acquisition condition A, excitation light intensity 8 (one setting value)}, and secondly second teaching data 2202 configured from {a second image B, a second acquisition condition B, excitation light intensity 8 (one setting value)}.

At step 1536 the teaching data generation section 706 of the information processing device 102 transmits the teaching data (the two sets of teaching data 2201, 2202) to the server 104. The server 104 utilizes the teaching data to update the model of computation (by utilization at step 2802 of FIG. 15).

The second example of a case in which teaching data is generated by user mediation as described above omits the "setting start" button 1811 and the "setting complete" button 1812 of the first example (see FIG. 9). In the second example, detecting the stage 220 as being stationary and detecting the pressing of the "Capture" button 2310" are substituted for the tasks of pressing the "setting start" button 1811 and pressing the "setting complete" button 1812. Thus in the second example the teaching data can be generated even without the explicit intent of a user to generate teaching data.

Next, description follows regarding a case in which teaching data including plural setting values (self-determined as right by a user) are generated through user mediation. The current case is similar to the first example and the second example of cases in which the teaching data including a single setting value is generated through user mediation, and so detailed description thereof will be omitted, and only the different configuration therefrom will be described. A case in which the teaching data including plural setting values (self-determined as right by a user) are generated will be described with reference to the first example of a case in which the teaching data including a single setting value is generated through user mediation.

In the first example the excitation light intensity 8 is set as the most appropriate value in the second image acquisition condition. In contrast thereto, the present case in which teaching data including plural setting values is generated differs in that plural (for example, four) values are set, such as excitation light intensity of 8, applied voltage of 180, scan speed of $\frac{1}{16}$, pinhole size of 40.

Figure 14:
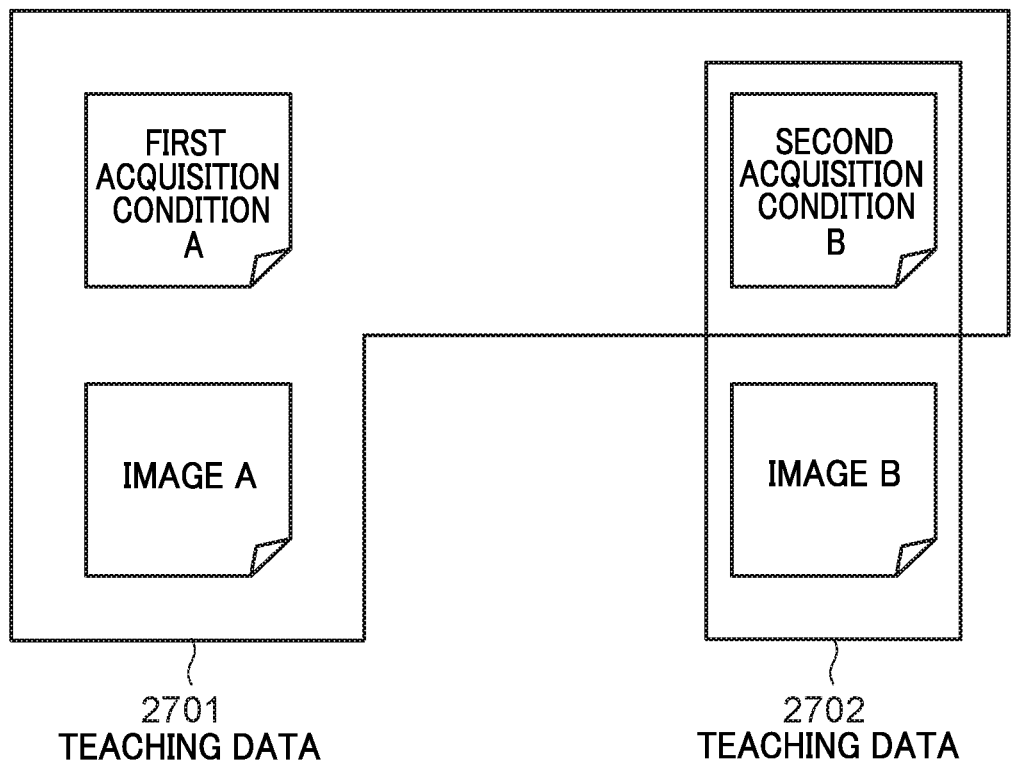
FIG. 14 is a diagram illustrating two sets of teaching data for a case in which teaching data that includes plural setting values is generated.

Two sets of teaching data will now be described for a case in which teaching data including plural setting values are generated, with reference to FIG. 14. As illustrated in FIG. 14, the two sets of teaching data are configured by the first teaching data 2701 and the second teaching data 2702.

The first teaching data 2701 includes {first image A, first acquisition condition A (excitation light intensity of 10, applied voltage of 100, scan speed of 1, pinhole size of 20), and second acquisition condition B (excitation light intensity of 8, applied voltage of 180, scan speed of $\frac{1}{16}$, pinhole size of 40). The second teaching data 2702 includes (second image B, second acquisition condition B). Note that excitation light intensity of 8, applied voltage of 180, scan speed of $\frac{1}{16}$, pinhole size of 40 are accurate setting values (right setting values). The teaching data are transmitted to the server 104, and the server 104 utilizes the teaching data to update the model of computation (by utilization at step 2802 of FIG. 15).

Model-of-Computation Update Processing Using Teaching Data

Next, description follows regarding a first update processing of a model of computation using teaching data.

Firstly, with reference to FIG. 15 and FIG. 16, input of the first image and the first acquisition condition values, output of a single setting value that is a value in the second acquisition condition, and first update processing to update the model of computation will be described.

Figure 15:
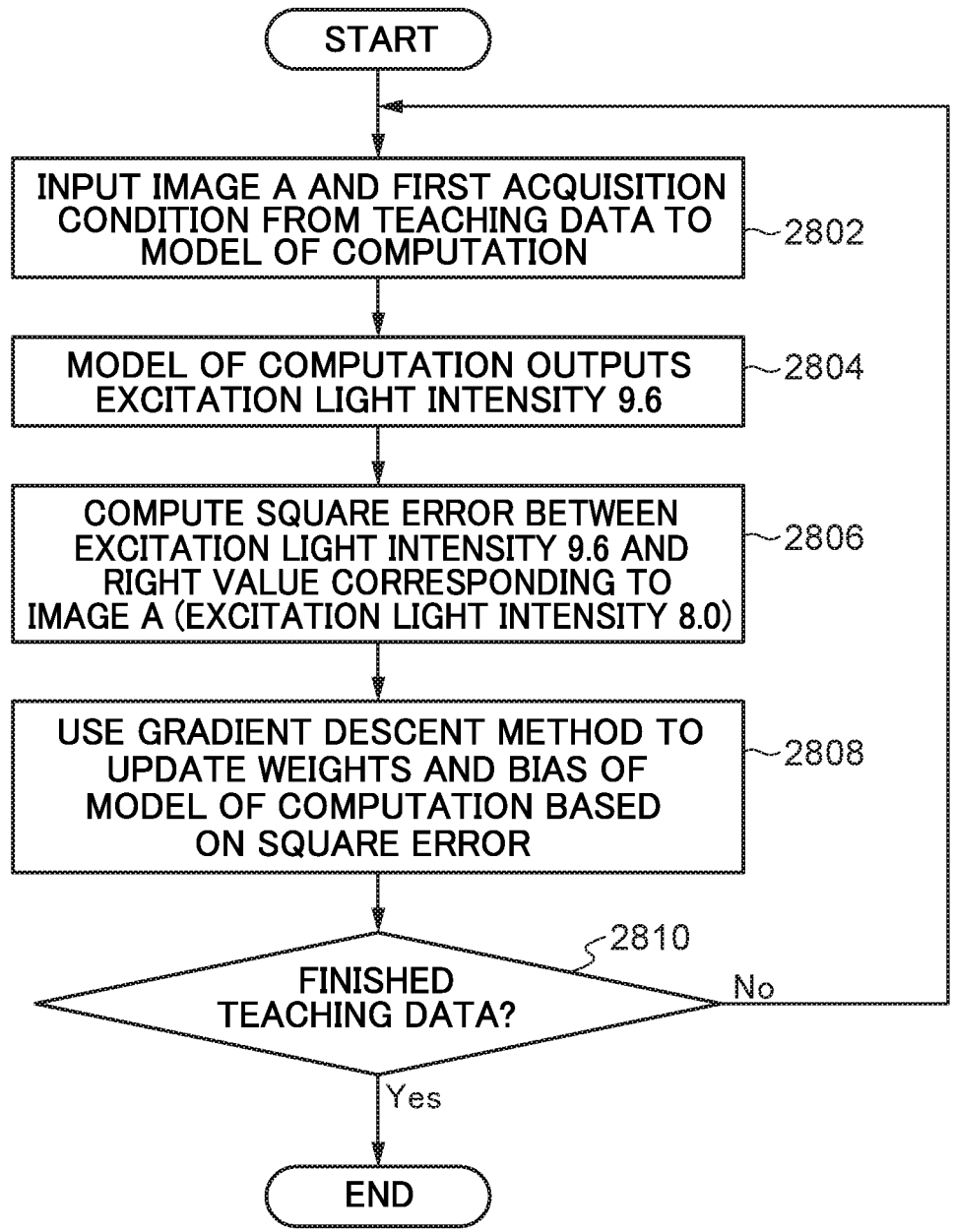
FIG. 15 is a flowchart illustrating an example of a model-of-computation update processing program executed by a CPU 502 of the server 104.
Figure 16:
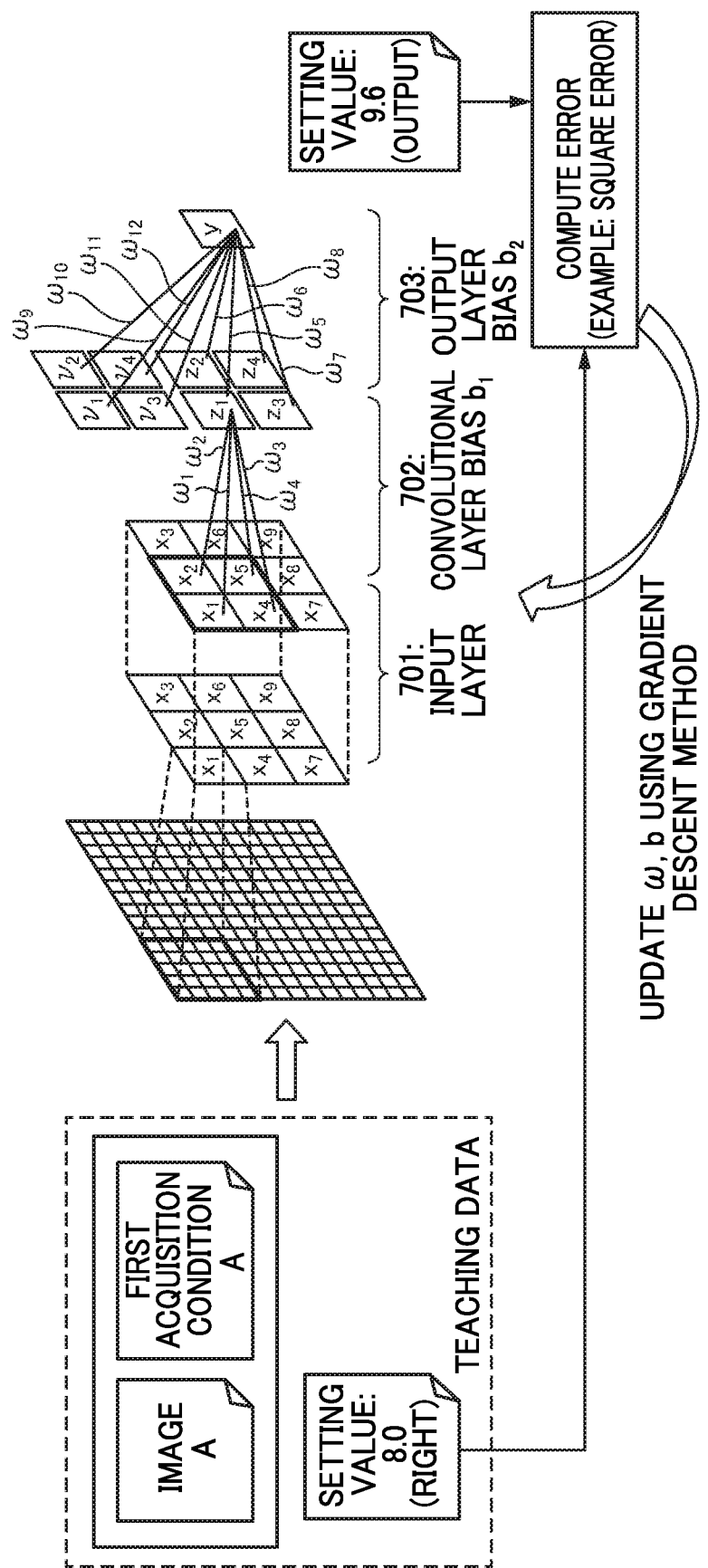
FIG. 16 is a diagram illustrating an example of operation of model-of-computation update processing.

When the model-of-computation update processing of FIG. 15 is started, at step 2802 the machine learning section 802 inputs a first image A of the teaching data to the input layer 701 of the model of computation, as data that has been image processed (for example, by down sampling), and inputs the first acquisition condition to the output layer 703, as illustrated in FIG. 16. Note that an image of merely a region (ROI) of the sample 208 may be input to the input layer 701.

The teaching data employed at step 2802 is the teaching data transmitted at step 1026 of FIG. 10 and at step 1536 of FIG. 13.

At step 2804, the machine learning section 802 outputs from the model of computation, via the convolutional layer 702 and the output layer 703, a setting value (for example: excitation light intensity y=9.6) that is a value of a second acquisition condition.

At step 2806, the machine learning section 802 computes a square error between the output setting value (for example: excitation light intensity y=9.6) and the right value (for example: excitation light intensity y=8 (setting value)) corresponding to the input image A (see also FIG. 16).

At step 2808, based on the square error, the machine learning section 802 updates weights co and bias b of the model of computation by a gradient descent method employing the following equation.

$$\omega_i \leftarrow \omega_i - \rho \times ((\partial(\text{square error}))/(\partial \omega_i))$$

$$b_j \leftarrow b_j - \rho \times ((\partial(\text{square error}))/(\partial b_j))$$

At step 2810, determination is made as to whether or not the processing described above (steps 2802 to 2810) has been executed for all the teaching data.

In cases in which determination has been made that the processing described above (steps 2802 to 2810) has not been executed for all the teaching data, processing returns to step 2802, and the processing described above (steps 2802 to 2810) is executed for the remaining teaching data.

However, in cases in which determination has been made that the processing described above (steps 2802 to 2810) has been executed for all the teaching data, then the current processing is ended.

The server 104 transmits to the information processing device 102 the model of computation updated as described above. The information processing device 102 stores the model of computation received from the server 104 in the setting value computation section 7020 as a substitute for the existing model of computation 704.

Teaching Data Generation Processing

Next, description follows regarding a case in which the teaching data is generated without user mediation.

Figure 17:
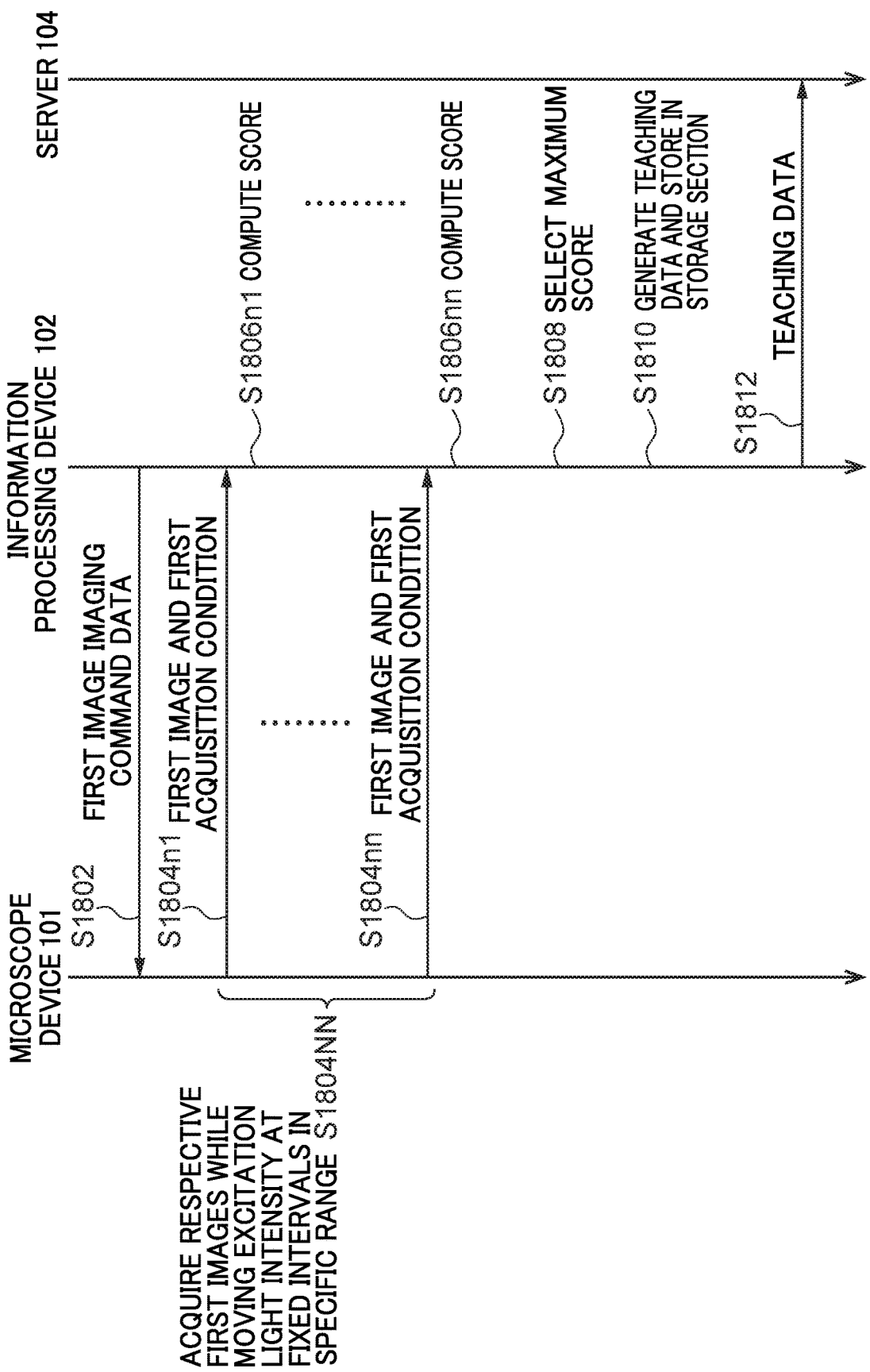
FIG. 17 is a diagram illustrating an example of a task sequence when an image acquisition processing program is executed by the CPU 302 of the microscope control section 218 of the microscope device 101 and the CPU 402 of the information processing device 102.

The teaching data generation processing executed by the CPU 402 of the information processing device 102 will now be described, with reference to FIG. 17. When the teaching data generation processing of FIG. 17 is started, at step 1802, the teaching data generation section 706 shifts the excitation light intensity serving as a value of the first acquisition condition in a specific range, for example, a fixed interval of from 0 to 80 in, for example, four steps (of 20 values), and transmits the first image imaging command data instructing acquisition of first images under each of these respective first acquisition condition values, and the microscope device 101 accordingly receives the first image imaging command data.

The control section 602 of the microscope device 101 sets respective excitation light intensities $X_i$ ($X_1$ to $X_{20}$) at step 1804NN, the image construction section 604 acquires first images $A_i$ ($A_1$ to $A_{20}$) at the respective excitation light intensities at steps 1804$n$1 to 1804$nn$ and saves the respective first acquisition conditions $E_i$ ($E_1$ to $E_{20}$) in the secondary storage device 308. At steps 1804$n$1 to 1804$nn$ the image construction section 604 transmits the respective first images $A_i$ ($A_1$ to $A_{20}$) and the first acquisition condition values $E_i$ ($E_1$ to $E_{20}$) to the information processing device 102, and the teaching data generation section 706 of the information processing device 102 receives each of the first images and the first acquisition condition values.

At step 1806$n$1 to 1806$nn$, the teaching data generation section 706 computes a score representing the image quality for each of the first images $A_i$ ($A_1$ to $A_{20}$). Examples of the score include computing a number of saturation pixels, an S/N ratio etc.

The number of saturation pixels is the number of pixels from the detection section 217 having a pixel brightness value of a specific value or greater.

The S/N ratio is computed using the following procedure from a single image composed of collected single pixel data obtained from the detection section 217.

Firstly, (1) each of the pixels of the image is classified into three classes according to brightness value. For example, a noise class of brightness values from 0 to 29, an exclude class of from 30 to 99, and a signal class of from 100 to 255.

Next, (2) a brightness average is computed for pixels classified as noise, and then, (3) a brightness average is computed for the pixels classified as signal.

Finally, (4) the S/N ratio is computed as signal brightness average/noise brightness average.

At step 1808, the teaching data generation section 706 selects as a setting value (right value) an excitation light intensity (for example, $X_2=8$) corresponding to the image with the maximum score (for example, $A_2$).

Figure 18:
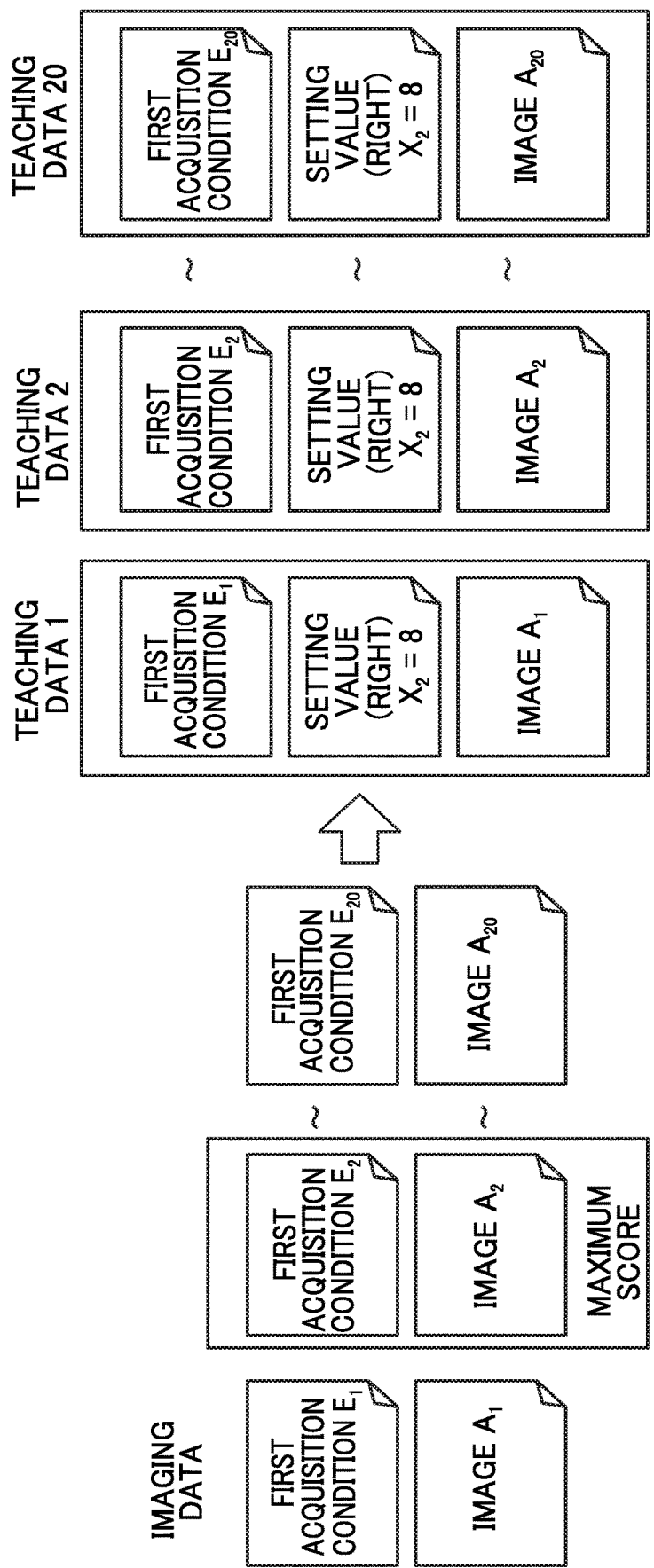
FIG. 18 is a diagram illustrating plural imaging data and plural teaching data corresponding to the respective imaging data.

At step 1810, the teaching data generation section 706 generates teaching data and saves the teaching data in the RAM 406. The teaching data includes plural sets in which each set includes an image, first acquisition condition values, and a setting value (right). More specifically, as illustrated in FIG. 18, the teaching data includes 20 sets of ($A_1$, $E_1$, $x_2$), ($A_2$, $E_2$, $x_2$), ($A_3$, $E_3$, $x_2$), . . . ($A_{20}$, $E_{20}$, $x_2$).

Figure 19:
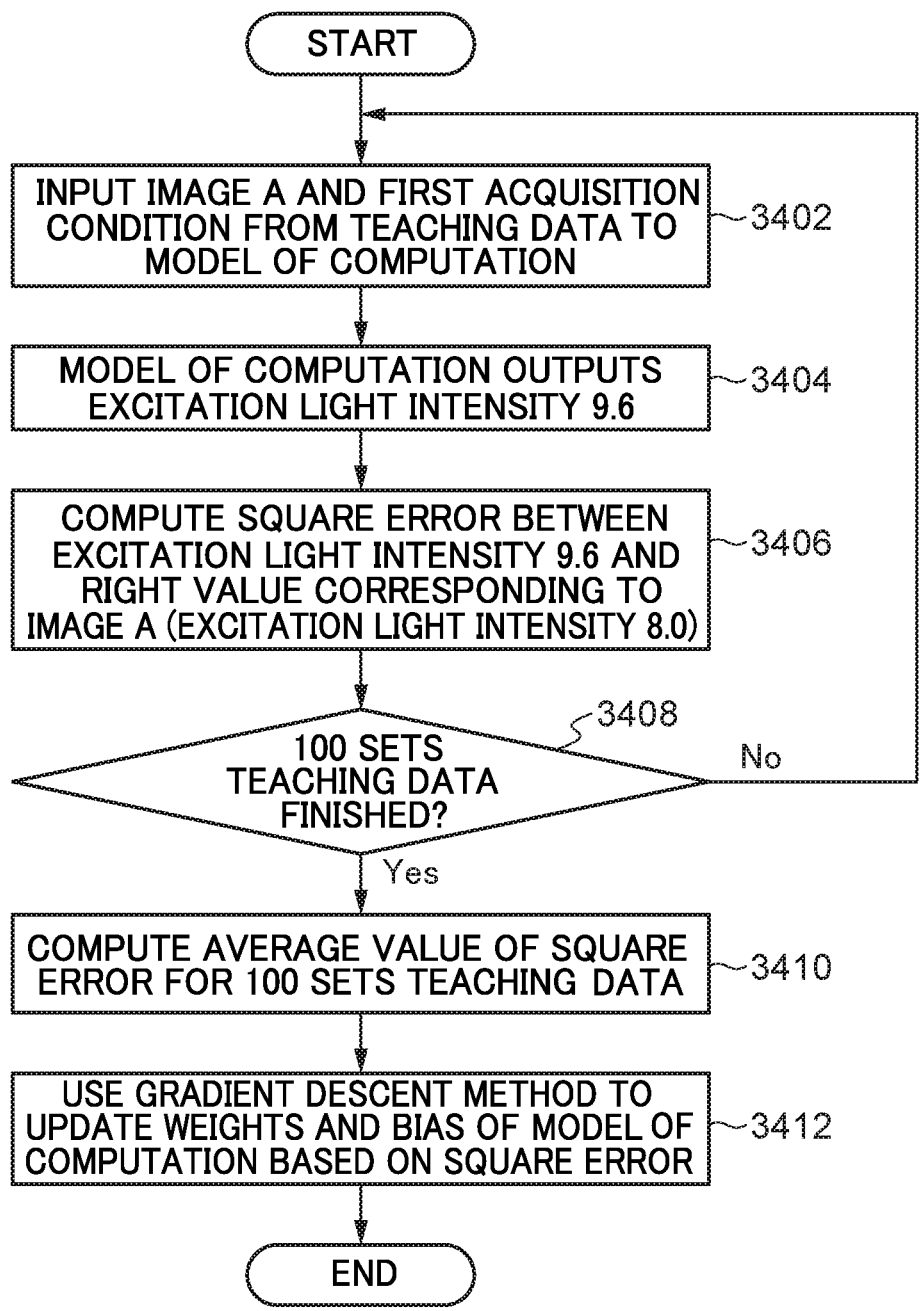
FIG. 19 is flowchart illustrating an example of a model-of-computation update processing program executed by the CPU 502 of the server 104.

At step 1812, the teaching data generation section 706 transmits the teaching data to the server 104. The server 104 utilizes the teaching data to update the model of computation (FIG. 19).

Model-of-Computation Update Processing Using Teaching Data

Next second update processing will be described for updating a model of computation through input of a first image and first image acquisition condition values and output of a single setting value using batch units.

Whereas in the first update processing the model of computation is updated using each of the plural teaching data, the second update processing differs therefrom in that the model of computation is updated by single batch units, with plural teaching data in a single batch unit.

FIG. 19 illustrates a flowchart of an example of a model-of-computation first update processing program. The same processing is executed at step 3402 to step 3406 of FIG. 19 as the processing of step 2802 to step 2806 of FIG. 15. Note that the teaching data employed at step 3402 is, as described above, teaching data transmitted at step 1812 of FIG. 17.

At step 3408, the machine learning section 802 determines whether or not the above processing (i.e. steps 3402 to 3408) has been executed for all the teaching data.

Processing returns to step 3402 in cases in which determination is made that the above processing (i.e. steps 3402 to 3408) has not been executed for all the teaching data, and the above processing (i.e. steps 3402 to 3408) is executed for remaining teaching data.

In cases in which determination is made that the above processing (i.e. steps 3402 to 3408) has been executed for all the teaching data, then at step 3410 the average value of square errors for 100 sets of teaching data is computed, and at step 3412 the weights and bias of the model of computation are updated based on the average square errors.

Figure 20:
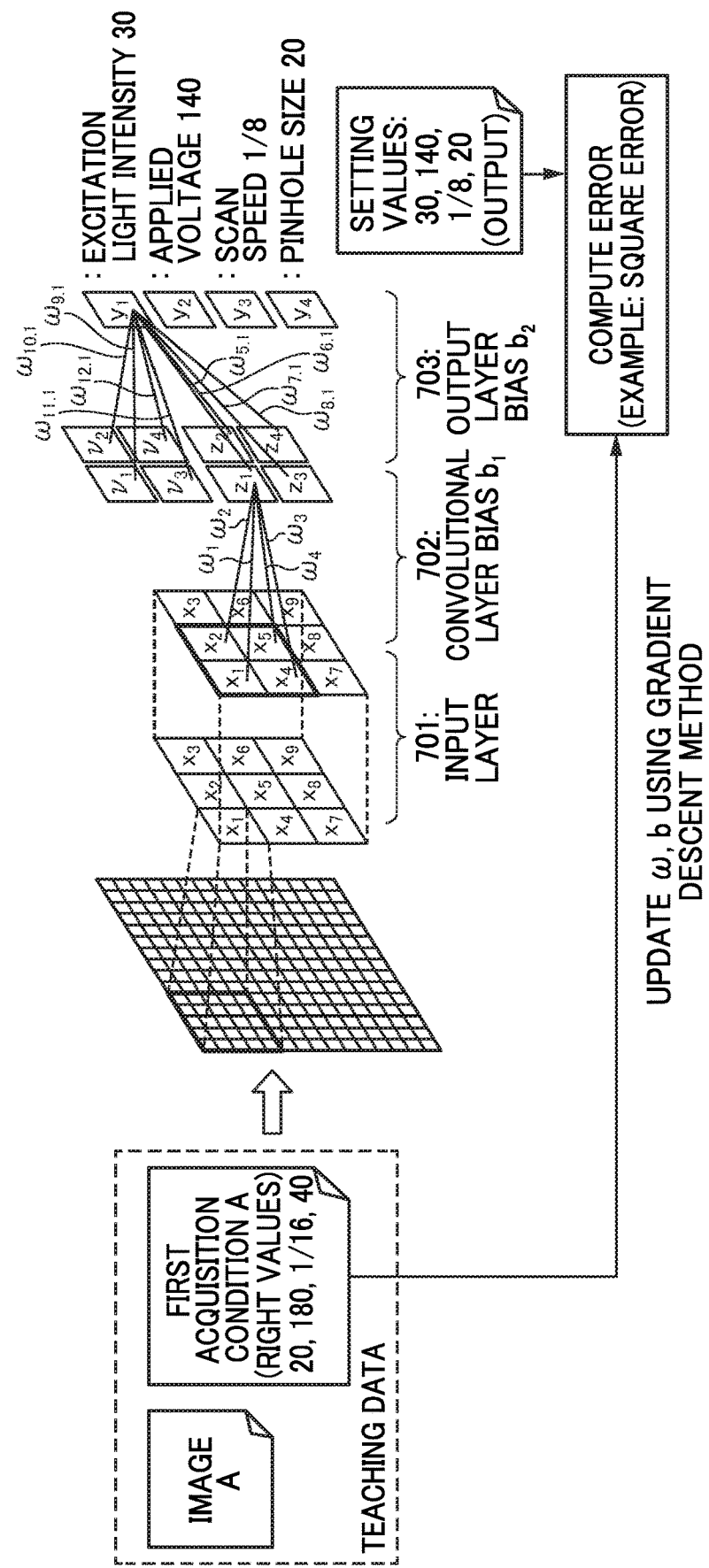
FIG. 20 is a diagram illustrating an example of operation of model-of-computation update processing.

Next description follows regarding third update processing in which a first image and first acquisition condition values are input, plural setting values are output, and the model of computation is updated. FIG. 20 illustrates an example of operation of model-of-computation update processing. The third update processing is substantially the same as the first update processing and the second update processing, and so detailed description thereof will be omitted, and only different configuration thereto will be described. Description follows regarding differences to the first update processing, with reference to FIG. 20.

In the first update processing, a single setting value (for example, excitation light intensity) is employed, however, in the third update processing, as illustrated in FIG. 20, plural, for example four, setting values are employed: excitation light intensity 30, applied voltage 140, scan speed ⅛, and pinhole size 20.

Specifically, four setting values (for example: excitation light intensity 30, applied voltage 140, scan speed ⅛, and pinhole size 20) are output from the model of computation via the convolutional layer 702 and the output layer 703 (step 3404 of FIG. 19).

Then the average square error is computed between the output setting values (excitation light intensity 30, applied voltage 140, scan speed ⅛, and pinhole size 20) and the right values that are the first acquisition condition (for example: excitation light intensity 20, applied voltage 180, scan speed 1/16, and pinhole size 40) (step 3406 of FIG. 19).

Based on the square errors, the above equations are employed to update the model of computation weights w and bias b using a gradient descent method.

During Normal Imaging

Next, description follows regarding, during normal imaging processing to display an image obtained by imaging the sample 208 once, processing to acquire a second image with values of a second acquisition condition decided based on the first image representing the sample 208, and the first acquisition condition values of the microscope device 101 when acquiring the first image.

Figure 21:
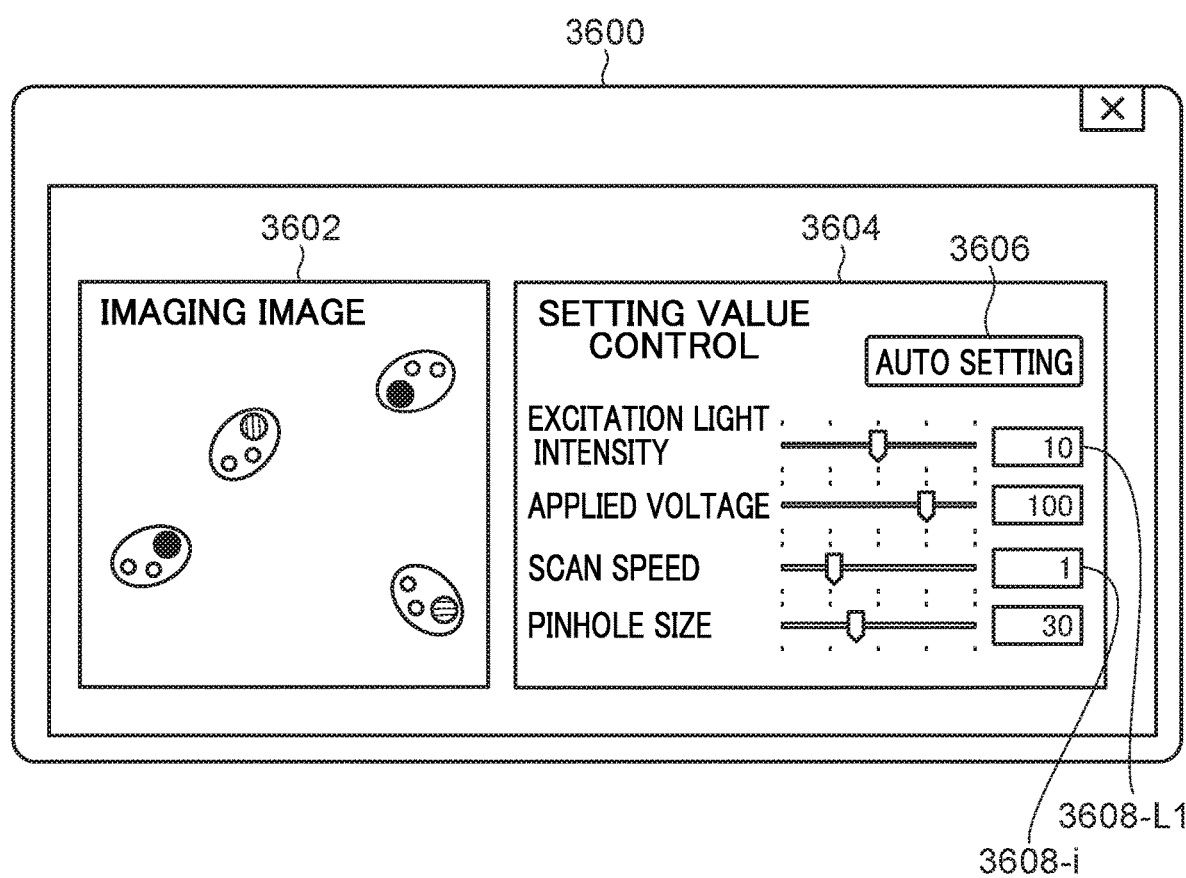
FIG. 21 is a diagram illustrating an example of a user interface for displaying a first image and a second image on a display screen 3600 of a display device 414 of the information processing device 102 and setting a value of a first acquisition condition.

With reference to FIG. 21, an example is illustrated of a user interface displayed on the display screen 3600 of the display device 414 of the information processing device 102 when a non-illustrated icon (on a screen of the display device 414 of the information processing device 102) is manipulated to instruct normal imaging. The user interface is for the first image or the second image, and for setting first acquisition condition values. As illustrated in FIG. 21, the user interface includes a display section 3602 for displaying the first image or the second image, and a setting value control section 3604 for setting the first acquisition condition values. In order to set each of the plural first acquisition condition values, the setting value control section 3604 includes plural slider bars 3608-i with knobs that are slid to change input values and an "Auto Setting" button 3606.

Figure 22:
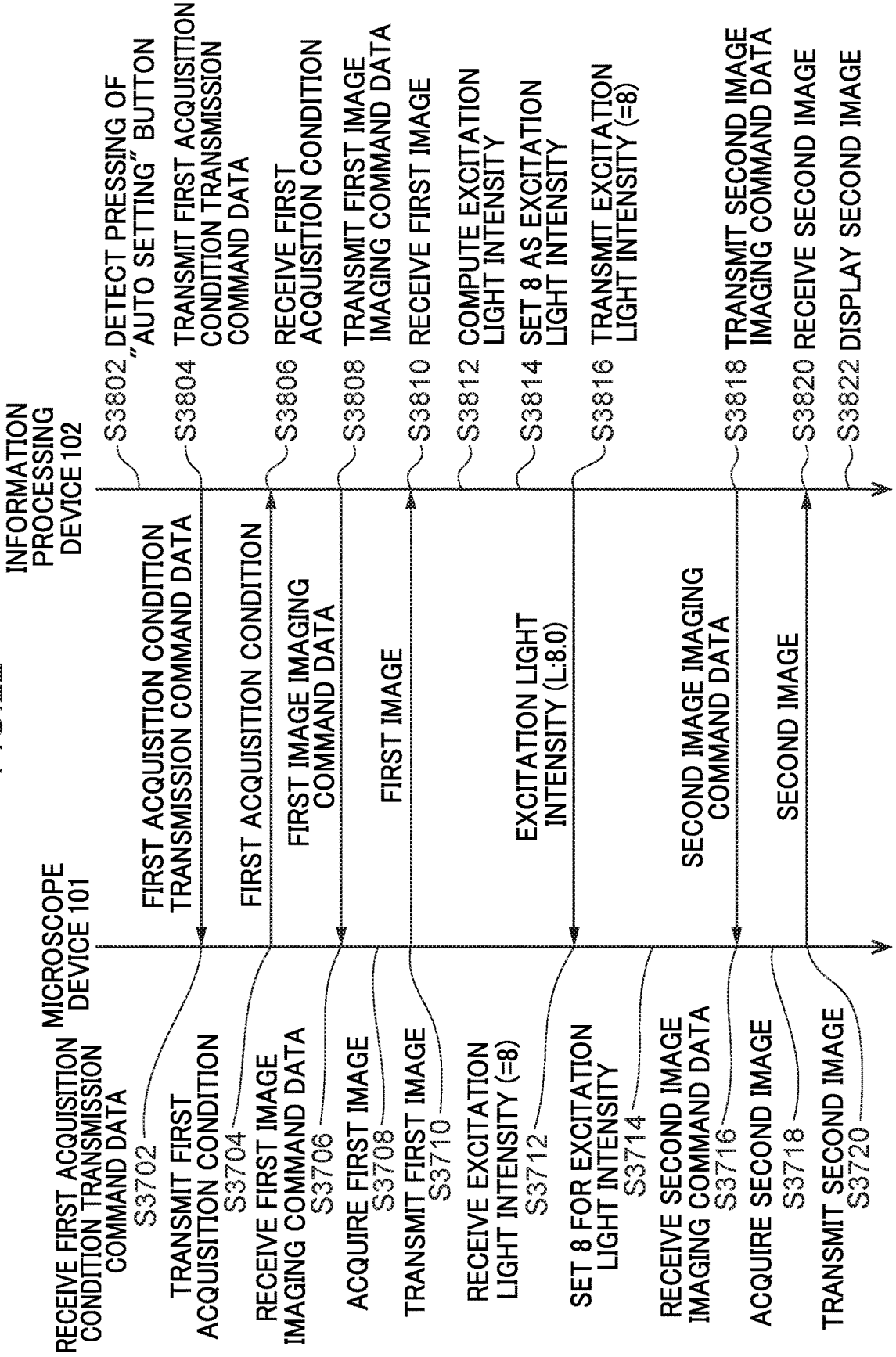
FIG. 22 is a diagram illustrating an example of a task sequence when an image acquisition processing program is executed by the CPU 302 of the microscope control section 218 of the microscope device 101 and the CPU 402 of the information processing device 102.

Next, description follows regarding image acquisition processing executed by the CPU 302 of the microscope control section 218 of the microscope device 101 and the CPU 402 of the information processing device 102, with reference to FIG. 22.

To instruct normal imaging the user presses the "Auto Setting" button 3606. At step 3802 the setting value computation section 7020 of the information processing device 102 accordingly detects the pressing of the "Auto Setting" button 3606. At step 3804, the setting value computation section 7020 transmits first acquisition condition transmission command data to the information processing device 102 to command the information processing device 102 so as to transmit the first acquisition condition values.

The control section 602 of the microscope device 101 accordingly receives the first acquisition condition transmission command data at step 3702. The control section 602 acquires the setting values (first acquisition condition) from each of the configuration sections of the microscope device 101 at step 3704. For example, an excitation light intensity value of 10, an applied voltage value of 100, a scan speed value of 1, and a pinhole size value of 30 are acquired. The control section 602 transmits the first acquisition condition values to the information processing device 102.

The setting value computation section 7020 of the information processing device 102 accordingly receives the first acquisition condition at step 3806. At step 3808 the setting value computation section 7020 transmits the first image imaging command data to the microscope device 101 to command the microscope device 101 to image the first image.

The control section 602 of the microscope device 101 accordingly receives the first image imaging command data at step 3706. At step 3708 the image construction section 604 acquires the first image under the current setting values (the first acquisition condition) of each of the configuration sections. At step 3710 the control section 602 transmits the first image to the information processing device 102.

The setting value computation section 7020 of the information processing device 102 accordingly receives the first image at step 3810.

Figure 23:
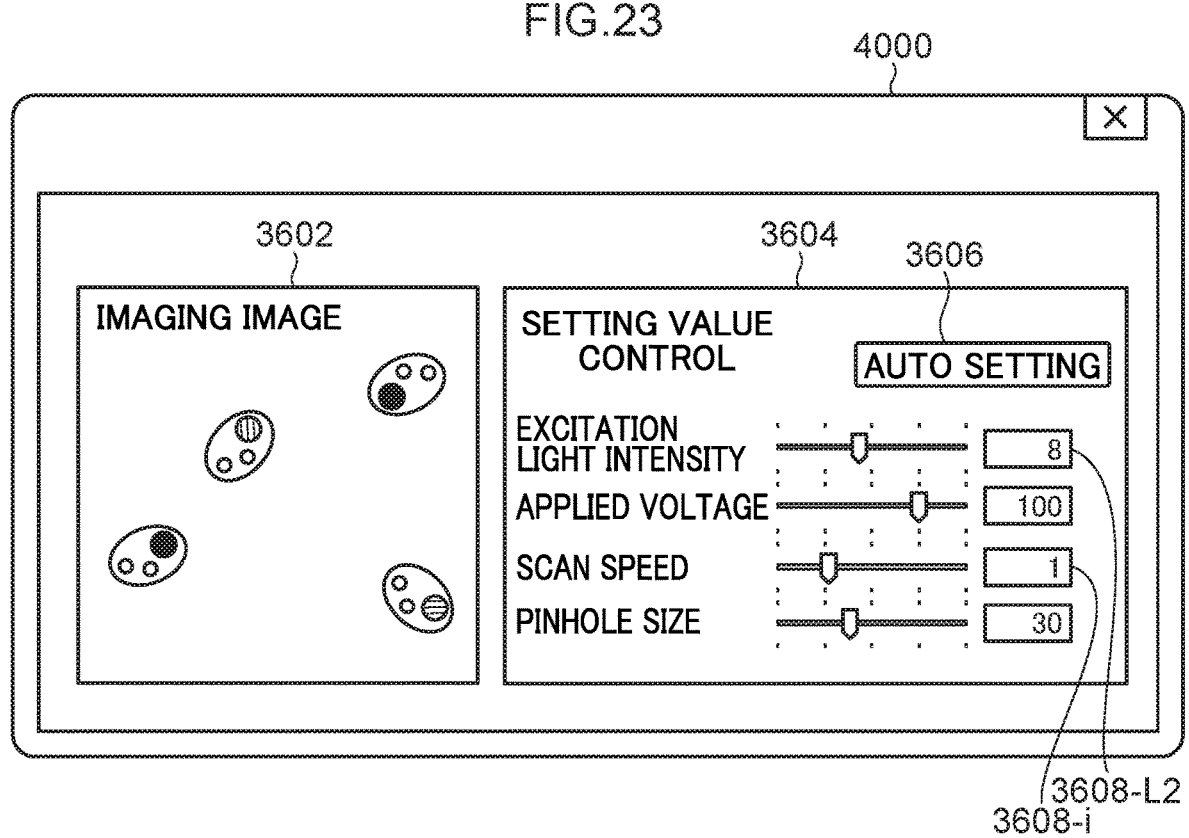
FIG. 23 is a diagram illustrating an example of a user interface displaying a second acquisition condition value, and a second image obtained with the second acquisition condition value.

At step 3812 the setting value computation section 7020 employs the model of computation 704 held in the setting value computation section 7020 (more specifically, stored in the secondary storage device 408) to compute the second acquisition condition values of the microscope device 101 from the first acquisition condition values and the first image. For example, 8 is computed as the excitation light intensity value. At step 3814 the value of the excitation light intensity is changed to 8. Thus although up to the execution of step 3814 the excitation light intensity has been 10 as represented by 3608-L1 in the slider bars 3608-i of the setting value control section 3604 of the user interface of FIG. 21, this is now changed to 8 as represented by excitation light intensity 3608-L2 as illustrated in FIG. 23. The setting value computation section 7020 transmits the excitation light intensity value=8 (second acquisition condition value) to the microscope device 101 at step 3816.

The control section 602 of the microscope device 101 accordingly receives the excitation light intensity value=8 (second acquisition condition value) at step 3712, and sets the light source section 209-1 so as to achieve the excitation light intensity value of 8 at step 3714.

At step 3818 the setting value computation section 7020 of the information processing device 102 transmits second image imaging command data to command the microscope device 101 so as to acquire the second image under the second acquisition condition values.

The control section 602 of the microscope device 101 accordingly receives the second image imaging command data at step 3716, and the image construction section 604 acquires the second image at step 3718 in a state in which an excitation light intensity value is 8, an applied voltage value is 100, a scan speed value is 1, and a pinhole size value is 30. The control section 602 transmits the second image to the information processing device 102 at step 3720.

The setting value computation section 7020 of the information processing device 102 accordingly receives the second image at step 3820, and displays the second image on the display section 3602 at step 3822.

During Live Imaging

Next, description follows regarding processing performed each time during Live imaging to display images successively imaging the sample 208, to acquire the second image under the second acquisition condition values, as decided based on the first image representing the sample 208 and based on the first acquisition condition values of the microscope device 101 when the first image was acquired.

Figure 24:
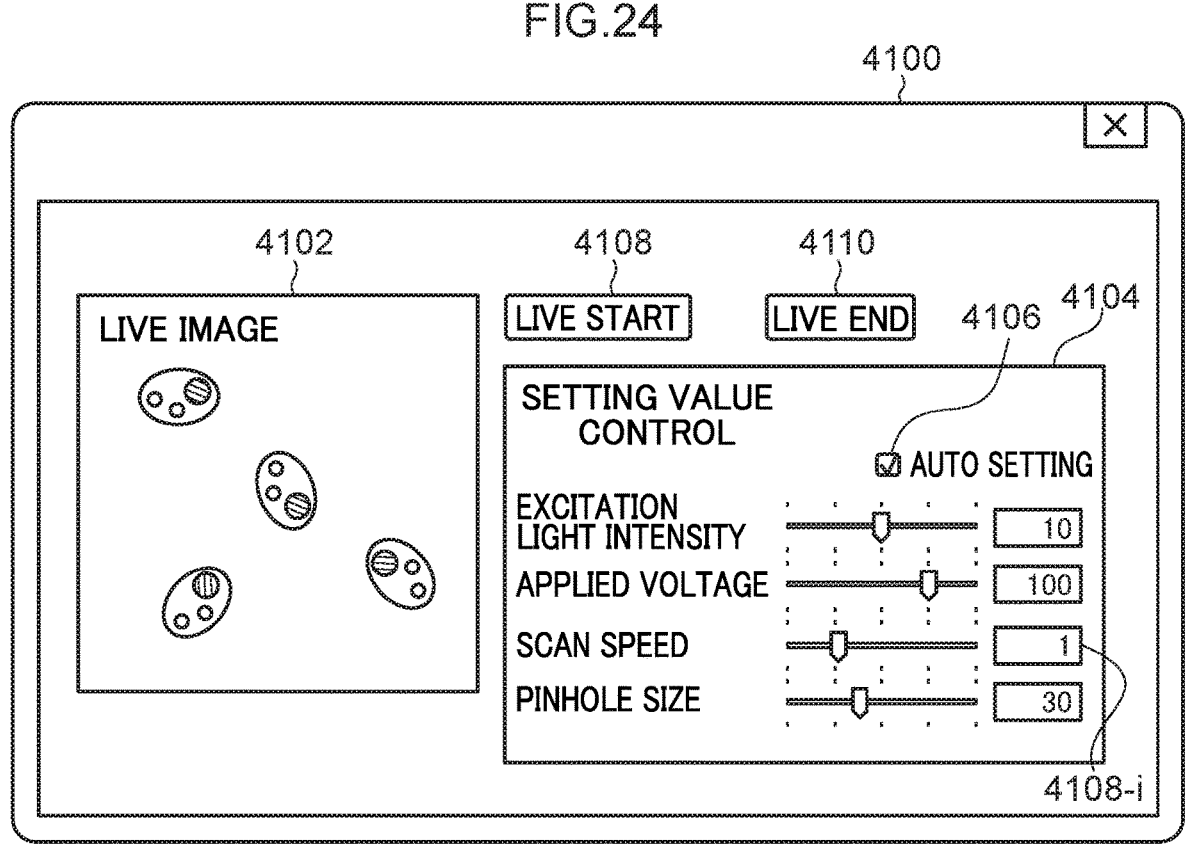
FIG. 24 is a diagram illustrating an example of a user interface, as displayed on a display screen 4100 of the display device 414 of the information processing device 102.

Description follows, with reference to FIG. 24, regarding a user interface displayed on the display screen 4100 of the display device 414 of the information processing device 102 when an non-illustrated icon (on a screen of the display device 414 of the information processing device 102) is manipulated to instruct Live imaging. As illustrated in FIG. 24, the user interface includes a display section 4102 to display the first image or the second image, a setting value control section 4104 to set the first acquisition condition values, a "Live start" button 4108 and a "Live end" button 4110. The setting value control section 4104 includes plural slider bars 4108-*i* with knobs that are slid to change input values and an "Auto Setting" check box 4106 in order to set each of the plural first acquisition condition values.

Figure 25:
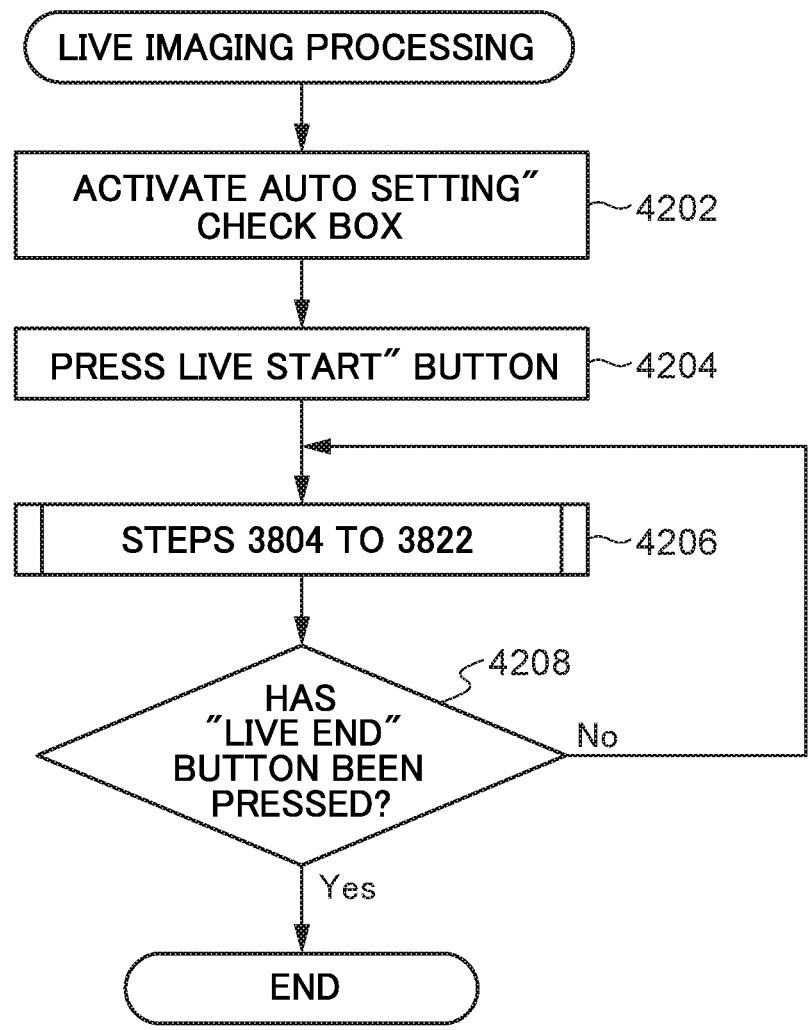
FIG. 25 is a flowchart illustrating an example of a Live imaging processing program executed by the CPU 402 of the information processing device 102.

Next, description follows regarding Live imaging processing executed by the CPU 402 of the information processing device 102, with reference to FIG. 25. To instruct Live imaging the user presses and activates the "Auto Setting" check box 4106. At step 4202 of FIG. 25, the setting value computation section 7020 of the information processing device 102 accordingly detects that the "Auto Setting" check box 4106 has been activated. The user continues by pressing the "Live start" button 4108. At step 4204 the setting value computation section 7020 accordingly detects that the "Live start" button 4108 has been pressed.

Next, at step 4206, steps 3804 to 3822 of FIG. 22 are executed. Normal image processing of FIG. 22 is accordingly executed as these steps are performed.

At the next step 4208, the setting value computation section 7020 determines whether or not the "Live end" button 4110 has been pressed. Processing returns to step 4206 in cases in which determination is made that the "Live end" button 4110 has not been pressed, and steps 3804 to 3822 of FIG. 22 are executed so as to execute the normal image processing of FIG. 22.

However, the user presses the "Live end" button 4110 when instructing Live imaging to end. Thus in such cases affirmative determination is made at step 4208, and the Live imaging processing is ended.

During Time-Lapse Imaging

Next, description follows regarding processing to acquire the second image under the second acquisition condition values decided based on the first image representing the sample 208 and based on the first acquisition condition values of the microscope device 101 when the first image was acquired. This processing is performed from the start of time-lapse imaging of the sample 208 until a specific time (an overall imaging time) has elapsed, and is performed each time time-lapse imaging is performed to display images being successively imaged at a fixed time (thinning imaging time) interval.

Figure 26:
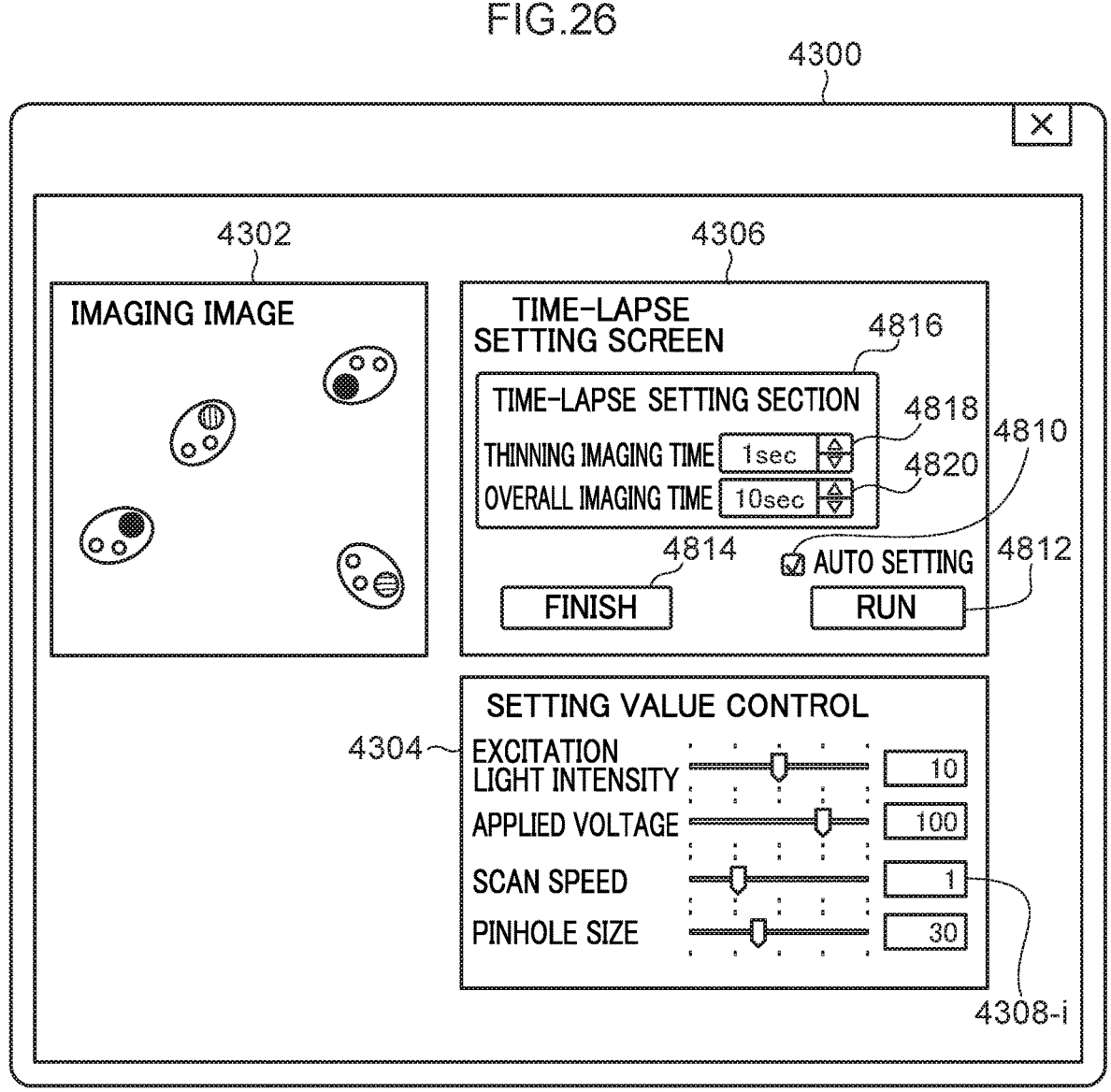
FIG. 26 is a diagram illustrating an example of a user interface, as displayed on a display screen 4300 of the display device 414 of the information processing device 102.

With reference to FIG. 26, description follows regarding a user interface displayed on a display screen 4300 of the display device 414 of the information processing device 102 when a non-illustrated icon (on a screen of the display device 414 of the information processing device 102) is manipulated to instruct time-lapse imaging.

As illustrated in FIG. 26, the user interface includes a display section 4302 to display the first image or the second image, a setting value control section 4304 to set the first acquisition condition values, and a time-lapse setting screen 4306. The setting value control section 4304 includes plural slider bars 4308-*i* with knobs that are slid to change input values in order to set each of the plural first acquisition condition values. The time-lapse setting screen 4306 includes a time-lapse setting section 4816, an "Auto Setting" check box 4810, a "Run" button 4812, and a "Finish" button 4814. The time-lapse setting section 4816 includes a thinning imaging time setting section 4818 to set the thinning imaging time, and a overall imaging time setting section 4820 to set the overall imaging time.

The thinning imaging time represents a time from a given imaging to the next imaging. The overall imaging time represents the overall time from the start of time-lapse imaging to the end of the final imaging. Namely, in cases in which the thinning imaging time is set to 1 second and the overall imaging time is set to 10 seconds, then eleven images are imaged from when time-lapse imaging is started, at 0 seconds, 1 second, 2 seconds, . . . 10 seconds.

Figure 27:
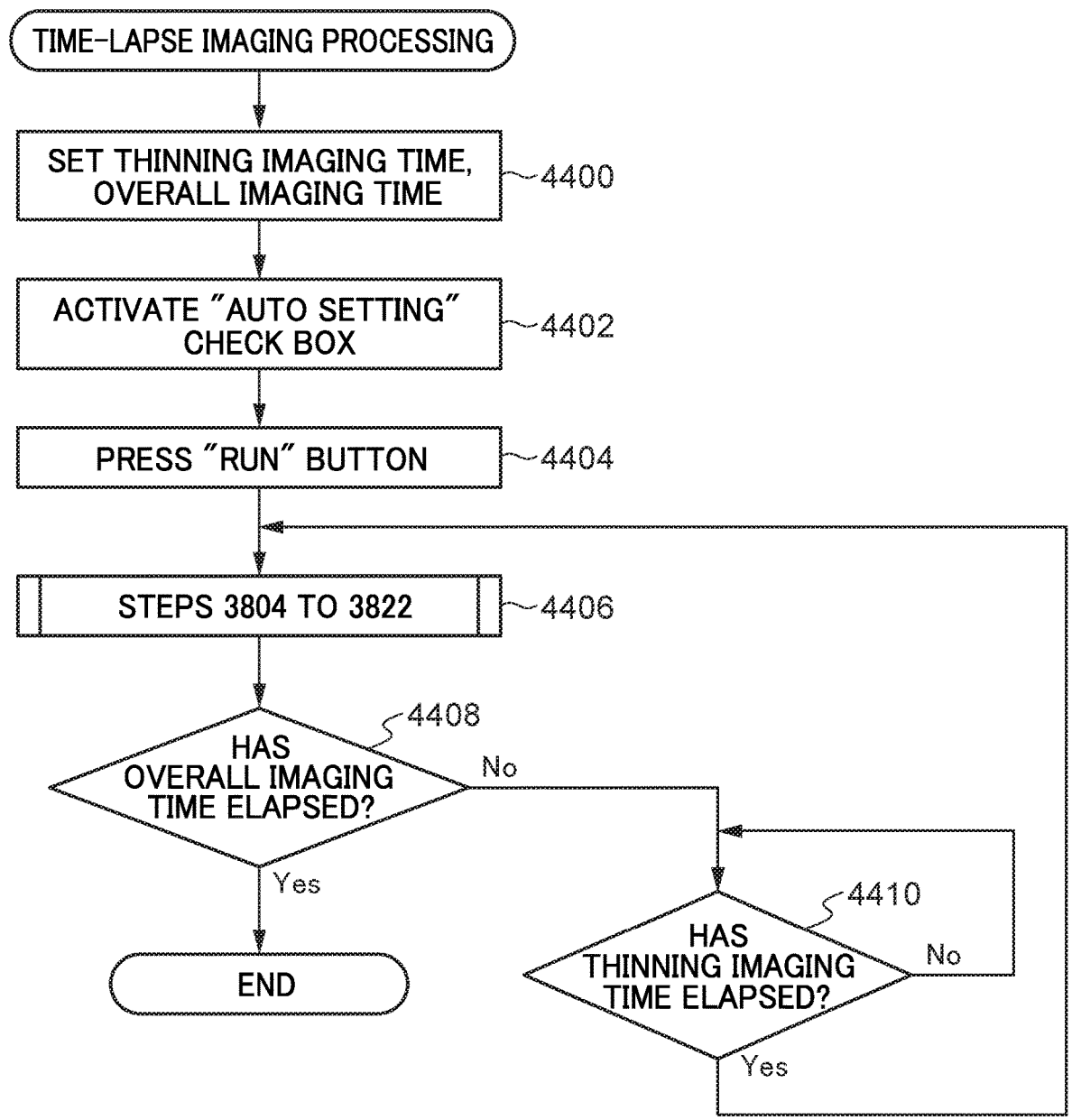
FIG. 27 is a flowchart illustrating an example of a time-lapse imaging processing program executed by the CPU 402 of the information processing device 102.

Next, description follows regarding the time-lapse imaging processing executed by the CPU 402 of the information processing device 102, with reference to FIG. 27.

In order to instruct time-lapse imaging a user sets the thinning imaging time on the thinning imaging time setting section 4818 of the time-lapse setting section 4816, and sets the overall imaging time on the overall imaging time setting section 4820 thereof (step 4400 of FIG. 27).

Then the user presses and activates the "Auto Setting" check box 4810. At step 4402 of FIG. 27, the setting value computation section 7020 of the information processing device 102 accordingly detects that the "Auto Setting" check box 4810 has been activated. The user then continues by pressing the "Run" button 4812. The setting value computation section 7020 accordingly detects at step 4404 that the "Run" button 4812 has been pressed.

Next, at step 4406, the steps 3804 to 3822 of FIG. 22 are executed. The normal image processing of FIG. 22 is accordingly executed as these steps are performed.

At the next step 4408, the setting value computation section 7020 determines whether or not the overall imaging time set at step 4400 has elapsed since the time-lapse imaging was started. In cases in which determination has been made that that the overall imaging time has not yet elapsed, the setting value computation section 7020 determines whether or not the thinning imaging time set at step 4400 has elapsed since step 4406 was executed. If the thinning imaging time has not yet elapsed then the setting value computation section 7020 waits until the thinning imaging time elapses. In cases in which the thinning imaging time has elapsed, the time-lapse imaging instruction processing returns to step 4406. The steps 3804 to 3822 of FIG. 22 are executed at step 4406, and the normal image processing of FIG. 22 is accordingly re-executed.

However, the time-lapse imaging processing is ended in cases in which determination is made that the overall imaging time set at step 4400 has elapsed since the time-lapse imaging was started at step 4408.

Note that the overall imaging time setting section 4820 may be set to unlimited. In such cases, after the start of time-lapse imaging, the time-lapse imaging is ended when the user presses a "Finish" button 4814.

Although, as illustrated in the example of FIG. 27, the information processing device 102 determines that the specific time has elapsed at step 4410, the determination as to whether or not the specific time has elapsed may be performed on the microscope device 101 side. Namely, together with executing of the step 4406 of FIG. 27, the microscope device 101 side may be configured to wait for the specific time each time the normal imaging processing of FIG. 22 is executed.

Sixth Modified Example

Next, description follows regarding a sixth modified example in addition to the first modified example to the fifth modified example described above. Points of difference of the sixth modified example to the first exemplary embodiment will now be described.

In the first exemplary embodiment described above, irrespective of the type of the sample 208, the information processing device 102 holds the model of computation 704 (see FIG. 4B), and the server 104 holds the model of computation 804 (see FIG. 4C). However, technology disclosed herein is not limited thereto, and models of computation dependent on the type (class) of the sample 208 may be employed.

The class here refers, for example, to cell type (nerve cells, myocardial cells, iPS cells, or the like) of the sample 208.

The shape and size of cells differ according to the cell type, and consequently the most appropriate values for the second acquisition condition are also different. This is because a significant factor is the effect of differences in appearance.

Figure 28:
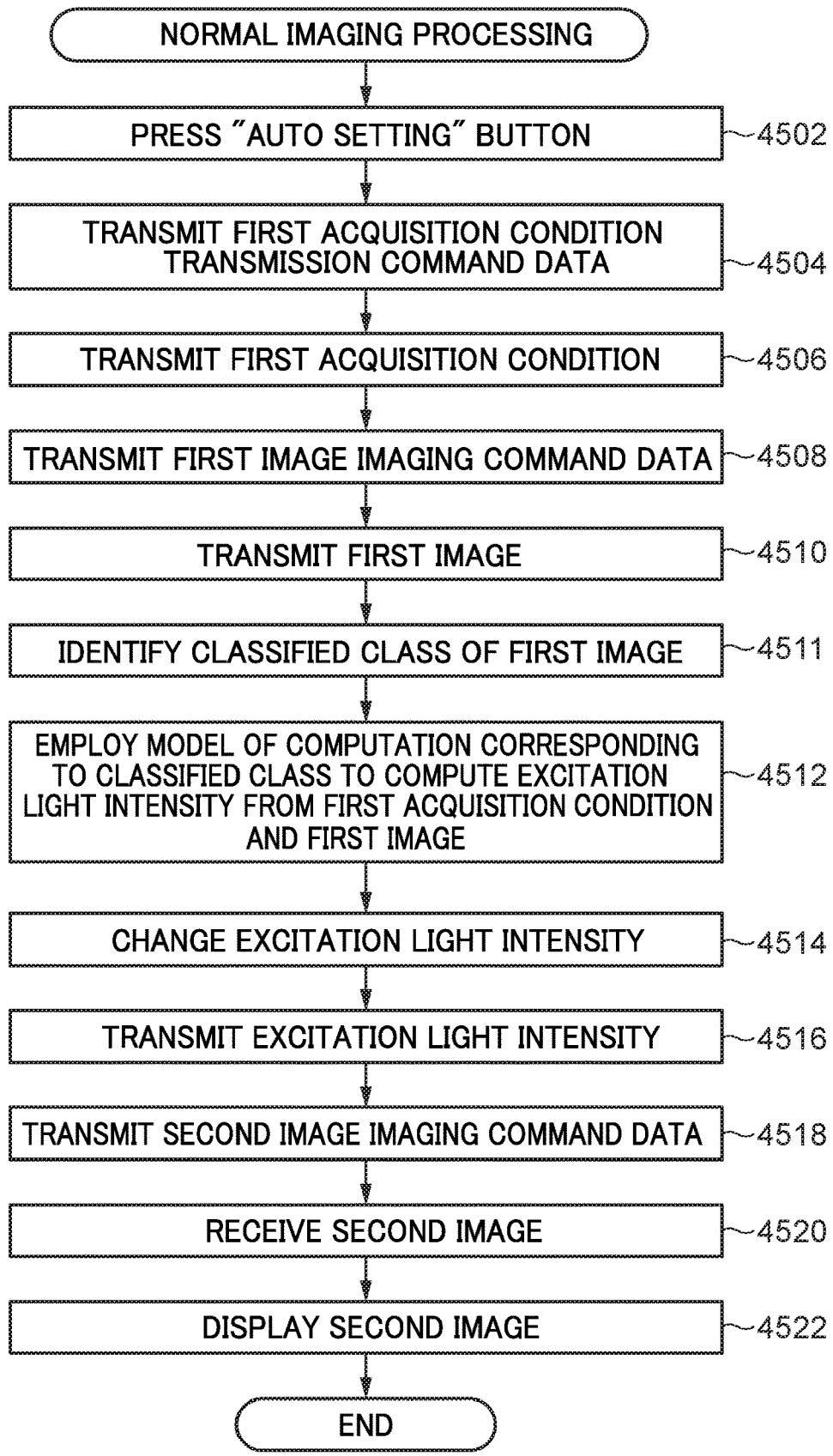
FIG. 28 is a flowchart illustrating an example of a normal imaging processing program executed by the CPU 402 of the information processing device 102 in a sixth modified example to instruct the microscope device 101 to perform normal imaging.
Figure 29:
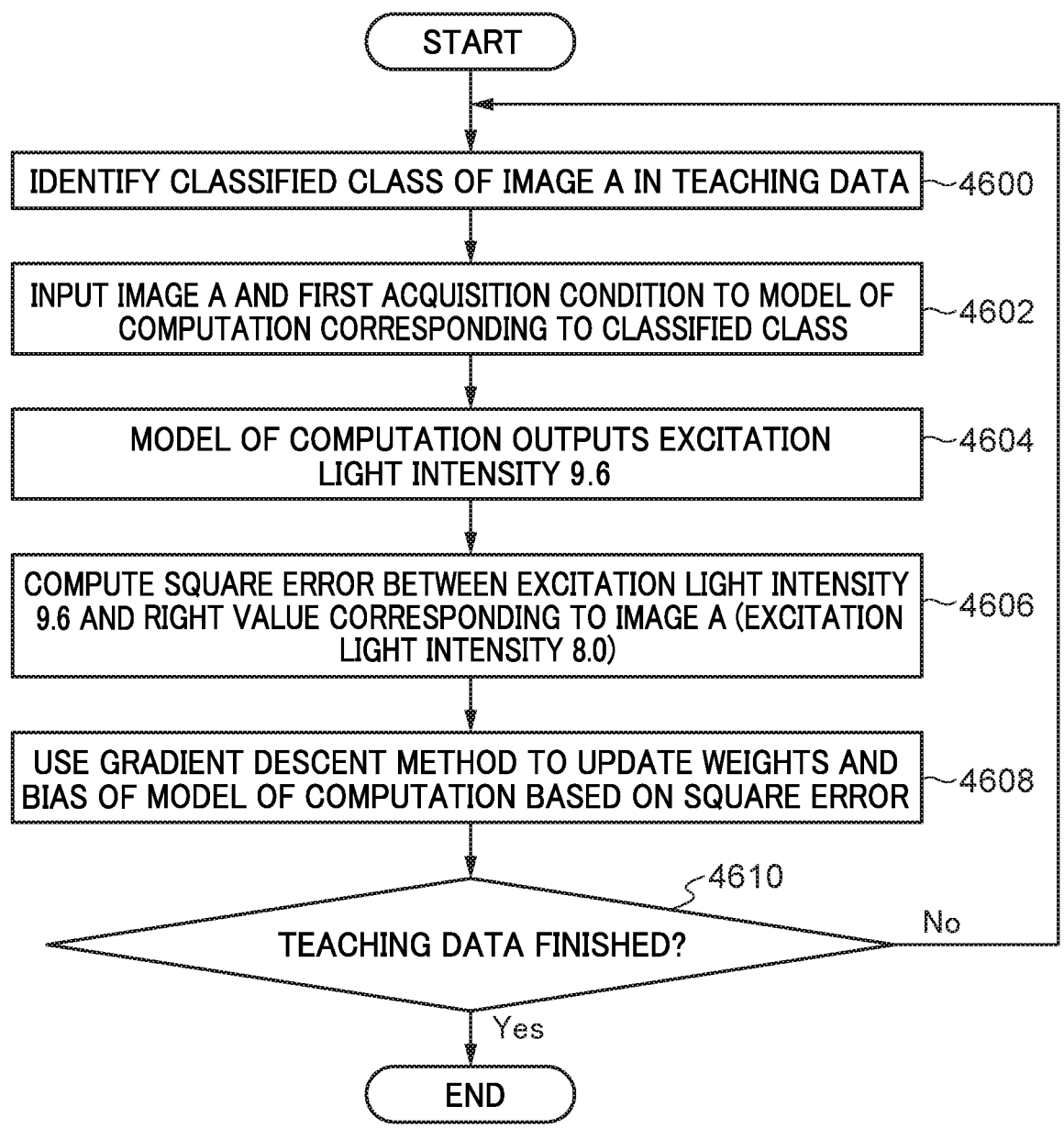
FIG. 29 is a flowchart illustrating an example of a model-of-computation update processing program executed by the CPU 502 of the server 104 in the sixth modified example.
Figure 30:
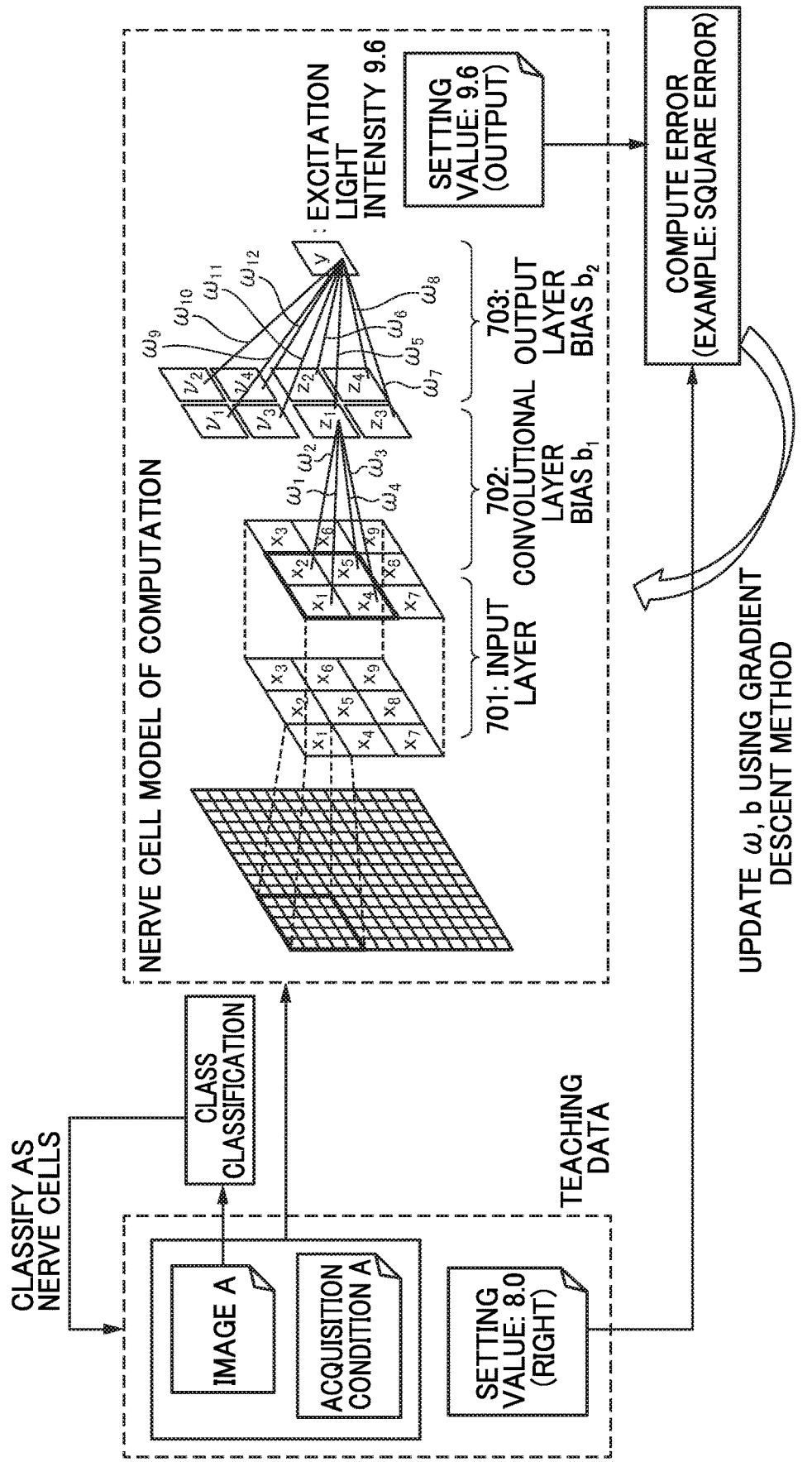
FIG. 30 is a diagram illustrating an example of operation of model-of-computation update processing in the sixth modified example.

Thus in the sixth modified example, although described in detail later, briefly a model of computation corresponding to the class of the sample 208 is employed to compute the second acquisition condition (FIG. 28), and training is performed on the model of computation corresponding to the class of the sample 208 (FIG. 29, FIG. 30).

In a case in which the cell type examples described above are present, the models of computation include a "nerve cell model of computation", a "myocardial cell model of computation", and an "iPS cell model of computation". Although the structure of multilayer neural network is common to these models of computation, the values of weights co and bias b are values that correspond to each type of cell. Namely, although the structure of models of computation is common across cell types, parameters held in the models of computation vary according to type of cell.

The precision of automatic setting of the second acquisition condition can be improved by employing the model of computation corresponding to the class of the sample 208 in this manner to compute the second acquisition condition, and to train the model of computation according to class.

Description follows regarding normal imaging processing in the sixth modified example, executed by the CPU 402 of the information processing device 102, to instruct the microscope device 101 to perform normal imaging, with reference to FIG. 28.

In the sixth modified example, a "nerve cell model of computation", a "myocardial cell model of computation", and an "iPS cell model of computation" are stored in the secondary storage device 408 of the information processing device 102 and in the secondary storage device 508 of the server 104, stored in association with an ID for the cell type.

To perform normal imaging of the sample 208, a user inputs an ID of the type of the sample 208 through the input device 412 of the information processing device 102.

In the normal imaging processing illustrated in FIG. 28, the steps 4502 to 4510 and the steps 4514 to 4522, are common from the point of view of execution to the steps 3802 to 3810 and the steps 3814 to 3822 of FIG. 22. However, there is a difference in that in the normal imaging instruction processing of FIG. 28 the step 4511 is executed between step 4510 and step 4512, and in that the model of computation employed at step 4512 is a model of computation corresponding to the class of the sample 208.

At step 4511, the setting value computation section 7020 identifies the class that the first image has been classified into based on the input ID. At step 4512, the model of computation corresponding to the classified class of step 4511 is employed to compute the excitation light intensity L from the first acquisition condition and the first image.

Next, description follows regarding model-of-computation update processing, with reference to FIG. 29. In the sixth modified example, in the teaching data generation processing (FIG. 10), a user inputs an ID of the type of sample 208 through the input device 412 of the information processing device 102. When generating the teaching data (step 1024), the ID of the sample 208 is appended to the teaching data.

At step 4600 of FIG. 29, the machine learning section 802 of the server 104 identifies the class the image A of the teaching data has been classified into based on the ID appended to the teaching data (see also FIG. 30). At the next step 4602, the images A and the first acquisition condition values are input to the model of computation corresponding to the classified class.

Following on from this, the processing of steps 2804 to 2810 of FIG. 15 is executed, at steps 4604 to 4610.

Next, description follows regarding a second exemplary embodiment.

Figure 31:
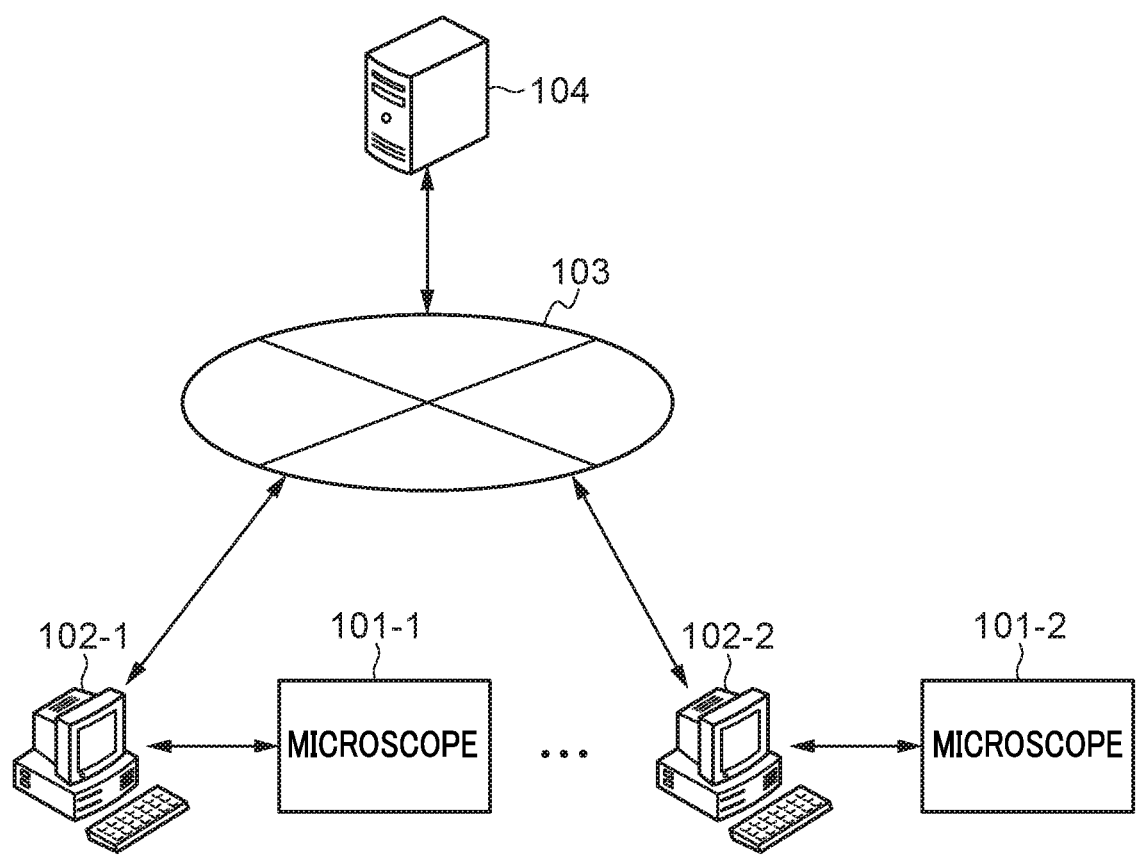
FIG. 31 is a diagram illustrating an example of a configuration of a microscope system of a second exemplary embodiment.

FIG. 31 illustrates an example of a microscope system of a second exemplary embodiment. As illustrated in FIG. 31, the microscope system of the second exemplary embodiment is equipped with plural sets of a microscope and an information processing device, and a server 104, mutually connected over a network 103. As illustrated in FIG. 31, each of the plural sets includes plural microscopes 101-1, 101-2, . . . and plural information processing devices 102-1, 102-2, . . . , which are each configured respectively similar to the microscope device 101 and the information processing device 102 of the first exemplary embodiment.

The operation of the second exemplary embodiment is substantially the same as the operation of the first exemplary embodiment, and so only configuration that differs therefrom will now be described.

Figure 32:
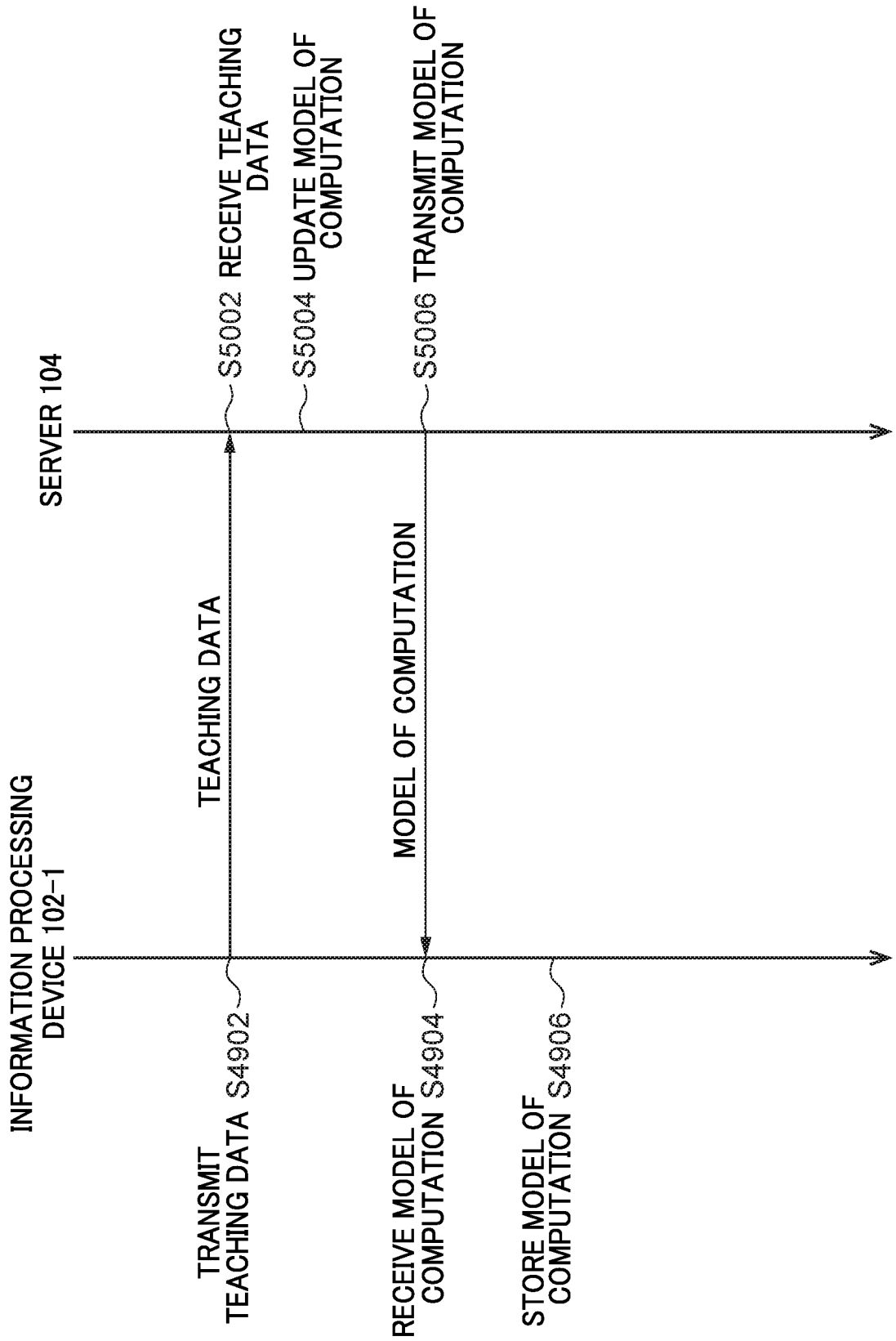
FIG. 32 is a diagram illustrating an example of a task sequence when a model-of-computation update processing program is executed by a CPU 302 of a microscope control section 218 of the microscope device 101 and a CPU 402 of the information processing device 102.

Description follows regarding a model-of-computation update processing program executed by each of the CPUs of the plural information processing devices 102-1, 102-2, . . . , and by the CPU 502 of the server 104, with reference to FIG. 32. The model of computation modification processing will now be explained below with reference to an example of the information processing device 102-1 as representative of the plural information processing devices 102-1, 102-2, . . . . At step 4902, the teaching data generation section 706 of the information processing device 102-1 transmits the teaching data to the server 104.

In the server 104 the teaching data has been transmitted to, the machine learning section 802 receives the teaching data at step S002, the machine learning section 802 updates the model of computation at step S004 based on the teaching data, and the machine learning section 802 transmits the updated model of computation to the information processing device 102 at step S006.

In the information processing devices 102-1, the setting value computation section 7020 receives the updated model of computation at step 4904, and the setting value computation section 7020 stores the updated model of computation at step 4906, substituted for the existing model of computation 704.

In the second exemplary embodiment as described above, the server 104 individually updates the model of computation in each of the plural information processing devices 102-1, 102-2, . . . . The technology disclosed herein is not limited thereto. For example, the server 104 may receive teaching data from all of the plural information processing devices 102-1, 102-2 . . . at step 4902, and may update all of the models of computation in the plural information processing devices 102-1, 102-2, . . . at step 4904.

Figure 33:
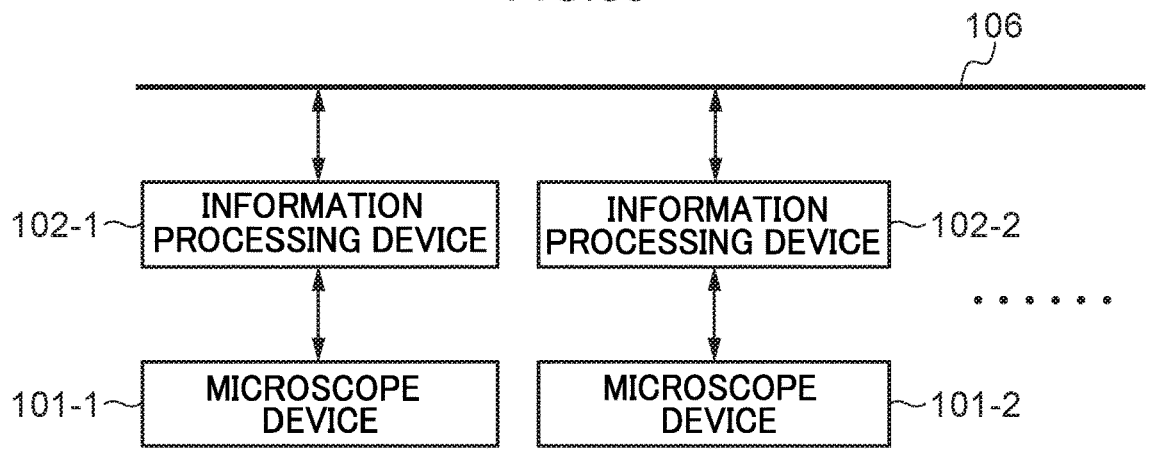
FIG. 33 is a diagram illustrating an example of a configuration of a microscope system lacking a server 104.

Moreover, the microscope system of the second exemplary embodiment as described above is also equipped with the server 104. However, the technology disclosed herein is not limited thereto, and the server 104 may be omitted. FIG. 33 illustrates an example of a configuration of a microscope system in which the server 104 is omitted. As illustrated in FIG. 33, this microscope system is equipped with plural sets that each include a microscope and an information processing device, mutually connected together over a network 106. As illustrated in FIG. 33, each of the plural sets includes plural respective microscopes 101-1, 101-2, . . . and plural respective information processing devices 102-1, 102-2, . . . having configurations respectively similar to those of the microscope device 101 and the information processing device 102 in the first exemplary embodiment.

Note that in such a case, one out of the plural information processing devices 102-1, 102-2 . . . , for example the information processing device 102-1, may include the functions of each of the information processing device 102 and the server 104.

MODIFIED EXAMPLES

Overall Configuration of Modified Examples

Figure 34A:
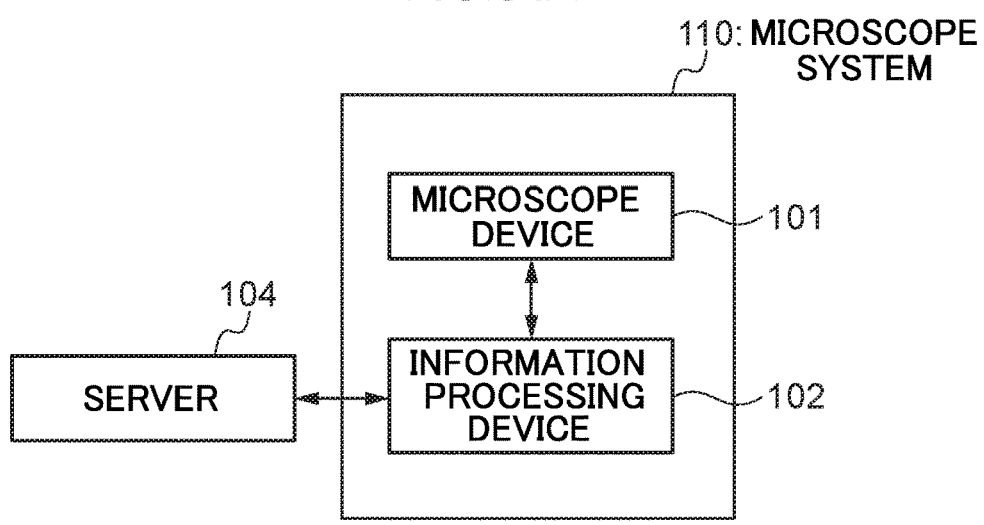
FIG. 34A is diagram illustrating a configuration of a first modified example of an overall configuration.
Figure 34B:
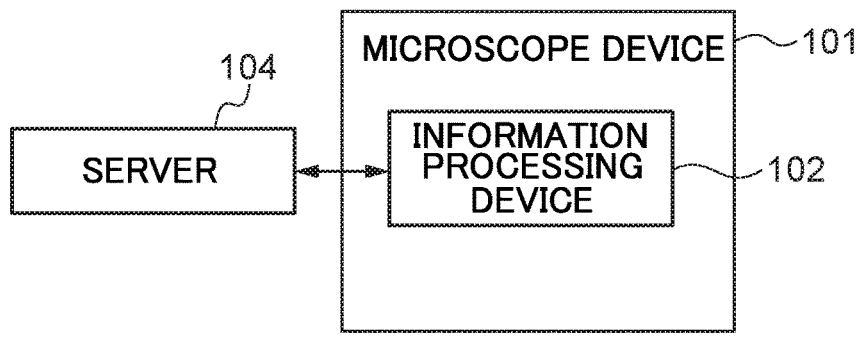
FIG. 34B is a diagram illustrating a configuration of a second modified example of an overall configuration.

Firstly, description follows regarding a modified example of an overall configuration of a system. FIG. 34A illustrates a configuration of a first modified example of an overall configuration. FIG. 34B illustrates a configuration of a second modified example of an overall configuration. The microscope system of the first exemplary embodiment is equipped with the microscope device 101, the information processing device 102, and the server 104, as illustrated in FIG. 1. However, the technology disclosed herein is not limited thereto, and a configuration may be adopted in which the server 104 is connected to a microscope system 110 equipped with a microscope device 101 and an information processing device 102, as illustrated in FIG. 34A. Moreover, in the technology disclosed herein, a configuration may be adopted in which the information processing device 102 is provided in the microscope device 101, as illustrated in FIG. 34B.

Image Acquisition Device Other than Laser Scanning Microscope

In each of the examples described above, examples have been described in which the second image acquisition condition is decided for the microscope device 101 that is a laser scanning microscope. However, the technology disclosed herein is not limited thereto, and application may be made to a microscope other than a laser scanning microscope. There are various microscopes that may be employed as a microscope other than a laser scanning microscope, such as, for example, an upright microscope, an inverted microscope, or the like. In such cases the second image acquisition condition includes the above object lens Z coordinate, the above object lens type, illumination light intensity, Z stack range, and filter type. The illumination light intensity referred to here is a brightness intensity of light from a halogen lamp when performing bright field microscopy with an upright microscope or an inverted microscope, or is a brightness intensity of light from a mercury lamp when performing fluoroscopy. Furthermore, in the technology disclosed herein, not only can application be made to a laser scanning microscope and to a microscope other than a laser scanning microscope, but application can also be made to deciding a second image acquisition condition of a camera connected to a microscope. The second image acquisition condition in such a case includes the exposure time, gain, binning, and white balance. The binning referred to here is a number of elements lumped together and treated as a single pixel when plural adjacent elements on a CCD chip are lumped together to raise the detected brightness. For example, in a case in which binning is 4, then a total of 4 pixels, configured from 2 adjacent rows added together both vertically and horizontally, are treated as a single pixel. The white balance is a value to correct for changes in the color of an imaging subject due to a color temperature of the light source.

Note that in technology disclosed herein there is no limitation to the above listed acquisition conditions for a laser scanning microscope, a microscope other than a laser scanning microscope, or a camera, and information about the device environment such as the temperature, humidity, or the like, or the temperature, humidity, or the like of the measurement subject, may be applied therefor.

Moreover, in each of the above examples a second image acquisition condition is decided based on the first image and the first image acquisition condition. However, the technology disclosed herein may be configured so as to decide plural second acquisition conditions from a single first image. For example, a configuration may be adopted in which, for example, the excitation light intensity, applied voltage, scan speed, and pinhole size are decided from a single first image.

Moreover, each processing of the examples described above is merely an example. Thus obviously steps not required may be omitted, new steps may be added, and the processing sequence may be swapped around within a scope not departing from the spirit of technology disclosed herein. Moreover, each processing may be implemented by a hardware configuration alone, such as by FPGAs, ASICs, or the like, or may be implemented by a combination of a hardware configuration and a software configuration using a computer.

OTHER MODIFIED EXAMPLES

Although in the examples described above a model of computation was employed to decide the second image acquisition condition, the technology disclosed herein is not limited thereto, and the second acquisition condition may be decided without employing a model of computation, as in the following first approach to third approach.

First Approach

Data obtained in each of the examples described above may be converted into a database as described below.

TABLE 2

| | First Acquisition Condition | | | | Second Acquisition Condition | | | | |
|---|---|---|---|---|---|---|---|---|---|
| First Image | First Item | Second Item | Third Item | Fourth Item | First Item | Second Item | Third Item | Fourth Item | Second Image |
| G1 | G1V11 | G1V12 | G1V13 | G1V14 | G1V21 | G1V22 | G1V23 | G1V24 | G12 |

TABLE 2-continued

| First Image | First Acquisition Condition | | | | Second Acquisition Condition | | | | Second Image |
|---|---|---|---|---|---|---|---|---|---|
| | First Item | Second Item | Third Item | Fourth Item | First Item | Second Item | Third Item | Fourth Item | |
| G2 | G2V11 | G2V12 | G2V13 | G2V14 | G2V21 | G2V22 | G2V23 | G2V24 | G22 |
| G3 | G3V11 | G3V12 | G3V13 | G3V14 | G3V21 | G3V22 | G3V23 | G3V24 | G32 |
| . | . | . | . | . | . | . | . | . | . |
| . | . | . | . | . | . | . | . | . | . |
| . | . | . | . | . | . | . | . | . | . |

After converting into a database, the second acquisition condition is decided in the following specific manner.

(1) as in the first exemplary embodiment, the first condition and the first image are acquired.

(2) (a) a distance L is computed between the first condition values ($v_1$, $v_2$, $v_3$, $v_4$) acquired at (1) and each of the values of plural first conditions in the database.

$$L=\sqrt{((G1V11-V1)^2+(G1V12-V2)^2+(G1V13-V3)^2+(G1V14-V4)^2)}$$

(b) first images corresponding to plural first conditions are selected in sequence of increasing distance from the first condition having the shortest distance in the database.

(3) a closest image to the first image acquired at (1) is extracted from out of the plural images selected at (2)(b).

The "closest image" may be obtained by (a) selecting the image having the highest computed likeness in pattern matching, or (b) by selecting the same cell type (nerve cell, myocardial cell, iPS cell etc.).

(4) a second condition (G1V21, G1V22, G1V23, G1V24) corresponding to the closest image (for example, G1) extracted at (3) is decided as the final second acquisition condition.

(5) the second image is acquired under the second acquisition condition decided at (4).

(6) the first image obtained at (1), the first condition, the second condition obtained at (4), and the second image obtained at (5) are added to the database (Table 2).

Second Approach

The second approach also employs the database of the first approach.

(1) the first condition and the first image are acquired as in the first exemplary embodiment.

(2) The "closest image" (similarly to (3) of the first approach) to the first image acquired at (1) is acquired from out of the database.

(4), (5), (6) of the first approach are executed as (3), (4), (5).

Third Approach

The second condition decided by a model of computation as in the first exemplary embodiment and the second exemplary embodiment is taken as a first mode, the first approach is taken as a second mode, and a user selects either the first mode or the second mode.

Other Inventions

Next, description follows regarding other inventions. In each of the examples described above, an acquisition condition is decided for the second image based on the first image and the acquisition condition for the first image. In contrast thereto, in other inventions an acquisition condition is decided for the second image based on the first image alone. This is more specifically as described below.

The data obtained in each of the examples described above are associated with each of plural images as described below (g1, g2, g3 . . . ) and a table (database) of most appropriate second acquisition conditions is prepared.

TABLE 3

| First Image | Second Acquisition Condition | Second Acquisition Condition | Second Acquisition Condition | Second Acquisition Condition | ... |
|---|---|---|---|---|---|
| g1 | j11 | j21 | j31 | j41 | ... |
| g2 | j12 | j22 | j32 | j42 | ... |
| g3 | j13 | j23 | j33 | j43 | ... |
| . | . | . | . | . | . |
| . | . | . | . | . | . |
| . | . | . | . | . | . |

The information processing device 102 acquires the current first image from the microscope device 101, and selects as a second acquisition condition for acquiring a second acquisition condition set (j12, j22, j32, j42, . . . ) corresponding to the "closest image" to the first image (similarly to in the first approach) (for example, g2).

Although detailed description has been given above with reference to the drawings regarding exemplary embodiments of the present invention, specific configurations do not limited the exemplary embodiments, the present invention includes design etc. within a range not departing from the spirit of the present invention.

All publications, patent applications and technical standards mentioned in the present specification are incorporated by reference in the present specification to the same extent as if each individual publication, patent application, or technical standard was specifically and individually indicated to be incorporated by reference.

REFERENCE NUMERALS 101 microscope
102 information processing device
104 server
209 light source section
213 scanner
231 pinhole drive section
704, 804 model of computation
7020 setting value computation section
602 control section

The invention claimed is:

1. A microscope system comprising:
   a storage portion that stores a model of computation, which receives one or more input signals to decide one or more output signals; and
   a processor that, using the model of computation, determines an acquisition condition of a second image based on (i) a first image and (ii) an acquisition condition of the first image, wherein the model of computation corresponds to a type of subject for acquiring an image, and wherein the processor:
- determines the second image acquisition condition using the model of computation corresponding to the type of subject;
- updates the model of computation using teaching data, the teaching data including (i) a first teaching image and an acquisition condition of the first teaching image, (ii) a second teaching image and an acquisition condition of the second teaching image, and (iii) a setting value of an acquisition condition corresponding to an image with maximum image quality;
- generates the first and second teaching images and selects the second teaching image from a plurality of images; and
- decides the second teaching image based on a score representing a quality of each of the plurality of images.

2. The microscope system of claim 1, wherein the teaching data with which the processor updates the model of computation corresponds to the type of subject.

3. The microscope system of claim 1, wherein the setting value corresponding to the image with maximum image quality is included in an acquisition condition under which the second teaching image was acquired.

4. The microscope system of claim 1, wherein:
- the first image is used as the first teaching image;
- the acquisition condition of the first image is used as the acquisition condition of the first teaching image;
- the second image is used as the second teaching image; and
- the acquisition condition of the second image is used as the acquisition condition of the second teaching image.

5. The microscope system of claim 1, wherein the acquisition condition of the second image includes a plurality of items.

6. The microscope system of claim 1, wherein the model of computation is generated using machine learning.

7. The microscope system of claim 1, wherein the model of computation includes a neural network.

8. The microscope system of claim 1, further comprising:
- an illumination optical system configured to illuminate an object with light emitted from a light source;
- a detection section configured to detect light from the object; and
- an image generation section configured to generate an image by employing the detected light.

9. A microscope system comprising:
- a storage portion that stores a model of computation, which receives one or more input signals to determine one or more output signals; and
- a processor (1) that, using the model of computation, determines an acquisition condition of a second image based on (i) a first image and (ii) an acquisition condition of the first image and (2) that updates the model of computation using teaching data, wherein:
- the teaching data includes a first teaching image and an acquisition condition of the first teaching image, a second teaching image and an acquisition condition of the second teaching image, and a setting value of an acquisition condition corresponding to an image with maximum image quality;
- the processor generates the first and second teaching images and selects the second teaching image from a plurality of images; and
- the processor decides the second teaching image based on a score representing a quality of each of the plurality of images.

10. The microscope system of claim 9, wherein the setting value corresponding to the image with maximum image quality is included in an acquisition condition under which the second teaching image was acquired.

11. The microscope system of claim 9, wherein:
- the first image is used as the first teaching image;
- the acquisition condition of the first image is used as the acquisition condition of the first teaching image;
- the second image is used as the second teaching image; and
- the acquisition condition of the second image is used as the acquisition condition of the second teaching image.

12. The microscope system of claim 9, wherein the acquisition condition of the second image includes a plurality of items.

13. The microscope system of claim 9, wherein the model of computation is generated using machine learning.

14. The microscope system of claim 9, wherein the model of computation includes a neural network.

15. The microscope system of claim 9, comprising:
- an illumination optical system configured to illuminate an object with light emitted from a light source;
- a detection section configured to detect light from the object; and
- an image generation section configured to generate an image by employing the detected light.

* * * * *